United States Patent
Aronesty et al.

(10) Patent No.: US 12,107,954 B2
(45) Date of Patent: Oct. 1, 2024

(54) LOCATION KEY SEARCH OF ENCRYPTED FILES WITHOUT DECRYPTION

(71) Applicant: Atakama LLC, New York, NY (US)

(72) Inventors: Erik A. Aronesty, New York, NY (US); Christopher Higley, New York, NY (US); Aman Grewal, New York, NY (US); Michael Krebs, New York City, NY (US); Joseph Oren Tysor, New York City, NY (US); Daniel Gallancy, Accord, NY (US); Alexander Pinkerton, New York, NY (US)

(73) Assignee: Atakama LLC, New York, NY (US)

( * ) Notice: Subject to any disclaimer, the term of this patent is extended or adjusted under 35 U.S.C. 154(b) by 398 days.

(21) Appl. No.: 17/743,784

(22) Filed: May 13, 2022

(65) Prior Publication Data

US 2022/0368527 A1 Nov. 17, 2022

Related U.S. Application Data

(60) Provisional application No. 63/334,814, filed on Apr. 26, 2022, provisional application No. 63/188,483, filed on May 14, 2021.

(51) Int. Cl.
| | | |
|---|---|---|
| *G06F 16/14* | (2019.01) | |
| *H04L 9/08* | (2006.01) | |
| *H04L 9/30* | (2006.01) | |
| *H04L 9/32* | (2006.01) | |

(52) U.S. Cl.
CPC .......... *H04L 9/3066* (2013.01); *G06F 16/152* (2019.01); *H04L 9/0861* (2013.01); *H04L 9/3218* (2013.01); *H04L 9/3242* (2013.01)

(58) Field of Classification Search
CPC ................ H04L 9/3066; H04L 9/0861; H04L 9/3218; H04L 9/3242; G06F 16/152
See application file for complete search history.

(56) References Cited

U.S. PATENT DOCUMENTS

| | | | | |
|---|---|---|---|---|
| 10,097,522 | B2* | 10/2018 | Philipp | ................ H04L 9/0894 |
| 10,740,474 | B1* | 8/2020 | Ghetti | ................ H04L 9/3066 |
| 2016/0344707 | A1* | 11/2016 | Philipp | ................ H04L 63/06 |
| 2017/0372094 | A1* | 12/2017 | Hore | ................ H04L 63/0428 |
| 2018/0144152 | A1* | 5/2018 | Greatwood | ........... H04L 63/123 |
| 2019/0087432 | A1* | 3/2019 | Sion | ................ G06F 21/6218 |
| 2022/0058198 | A1* | 2/2022 | Dupont | ................ G06F 21/602 |
| 2022/0292057 | A1* | 9/2022 | Ohba | ................ G06F 16/1824 |

* cited by examiner

*Primary Examiner* — Darshan I Dhruv
(74) *Attorney, Agent, or Firm* — Schwegman Lundberg & Woessner, P.A.

(57) ABSTRACT

A method for searching an encrypted file comprises: receiving a query from a first device of a set of devices; tokenizing the query; searching the encrypted file, without decrypting the file, for the tokenized query; aggregating results of the search; and outputting the aggregated results. The searching includes checking a bloom filter of an index of the encrypted file. The index includes a file public secret (R), a proof of work for the file secret (Rproof), a multipart threshold public encryption key (LKe-pub), a multipart threshold public search key (LKs-pub), and the bloom filter. The bloom filter including index values that are elliptic curve paired between a curve-hashed token of the encrypted file and the product of the encrypted file's ephemeral secret value (r) and the multipart threshold public search key (LKs-pub).

18 Claims, 21 Drawing Sheets

LOCATION KEY SEARCH OF ENCRYPTED FILES WITHOUT DECRYPTION

CROSS-REFERENCE TO RELATED APPLICATION

This application claims the benefit of priority to U.S. provisional patent application No. 63/188,483 filed on May 14, 2021, and titled "Location Key Based Search," and to U.S. provisional patent application No. 63/334,814 filed on Apr. 26, 2022 and titled "Encapsulated Search Index: Public-Key, Sub-linear, Distributed, and Delegatable," which are both incorporated by reference herein in their entirety.

TECHNICAL FIELD

The disclosed teachings generally relate to data encryption and/or decryption. The disclosed teachings more particularly relate to search encrypted filed without decrypting the files.

BACKGROUND

Security risks are inherent within the management of cryptographic keys. Traditional solutions, involving centralized key servers and passwords present challenges. Centralized key servers are appealing targets for adversaries while passwords are often forgotten, insufficiently complex or otherwise difficult to manage.

SUMMARY

A method for searching an encrypted file comprises: receiving a query from a first device of a set of devices; tokenizing the query; searching the encrypted file, without decrypting the file, for the tokenized query; aggregating results of the search; and outputting the aggregated results. The searching includes checking a bloom filter of an index of the encrypted file. The index includes a file public secret (R), a proof of work for the file secret (Rproof), a multipart threshold public encryption key (LKe-pub), a multipart threshold public search key (LKs-pub), and the bloom filter. The bloom filter including index values that are elliptic curve paired between a curve-hashed token of the encrypted file and the product of the encrypted file's ephemeral secret value (r) and the multipart threshold public search key (LKs-pub).

A non-transitory computer readable medium has stored thereon instructions to cause at least one processor to execute the method. A system includes the medium and at least one processor that executes the method.

This Summary is provided to introduce a selection of concepts in a simplified form that is further described below in the Detailed Description. This Summary is not intended to identify key features or essential features of the embodied subject matter, nor is it intended to be used to limit the scope of the embodied subject matter. Other aspects of the disclosed embodiments will be apparent from the accompanying Figures and Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
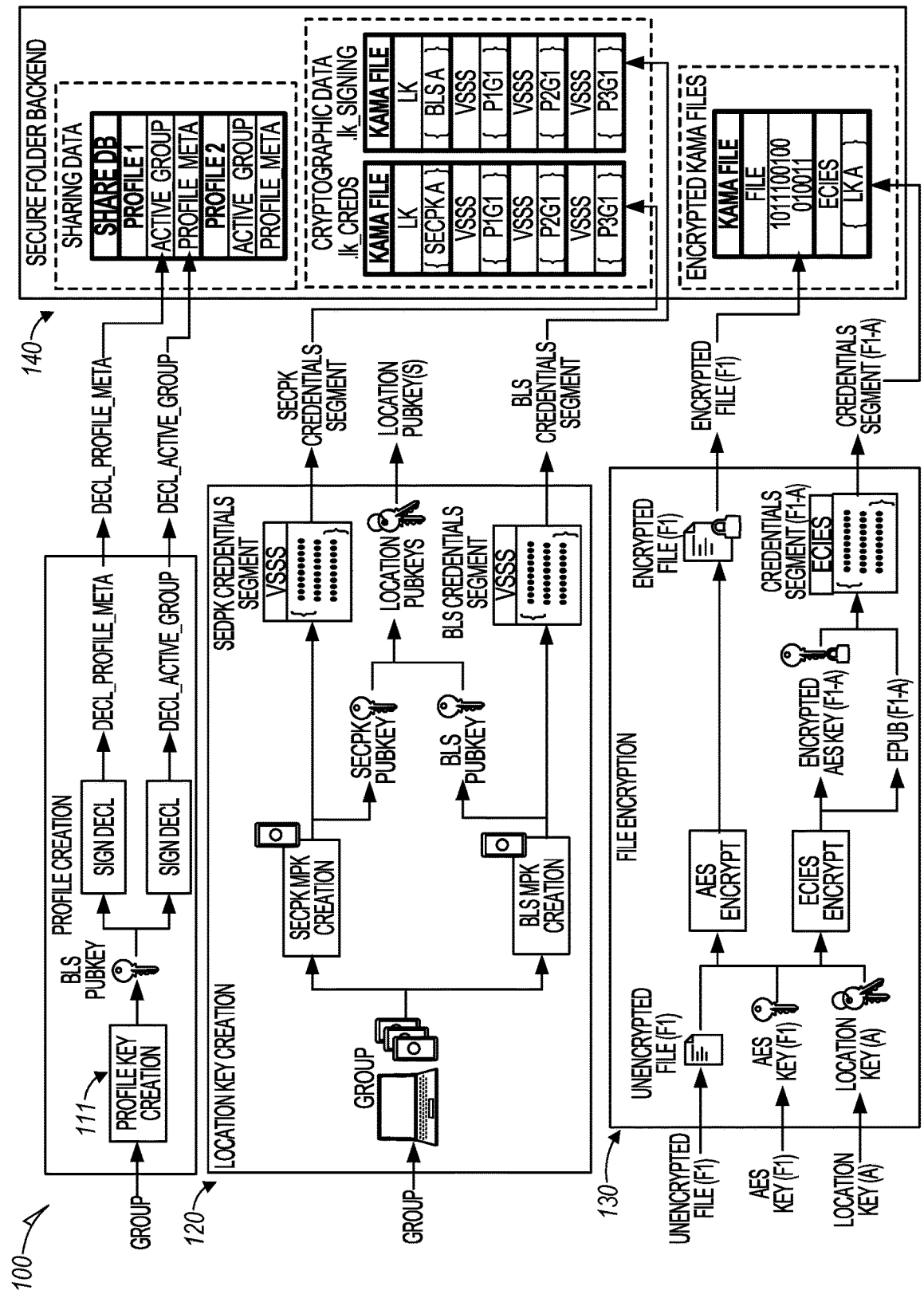
FIG. 1 is a block diagram that illustrates a system for implementing a location key encryption system.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

Terms such as "processing," "computing," "calculating," "determining," "displaying," "generating" or the like, unless specifically stated otherwise, may refer to actions and processes of a computing device that manipulates and transforms data represented as physical (electronic) quantities within the computer's memory or registers into other data similarly represented as physical quantities within the computer's memory, registers, or other such storage medium, transmission, or display devices.

The terms "connected," "coupled," or variants thereof, as used herein, may refer to any connection or coupling, either direct or indirect, between two or more elements. The coupling or connection between the elements can be physical, logical, or a combination thereof.

The terms "channel" or "link" contemplate a means of communicating data or information, whether wired or wireless, and may utilize digital cellular transmission standards (e.g., CDMA, W-CDMA, LTE, HSPA+). Examples include Bluetooth, Wi-Fi, Ethernet, USB, USB-C, Thunderbolt, auditory link, or visual link (e.g., QR code and camera). A message may be communicated directly between two devices or indirectly through another device (e.g., a relay device) on one or more channels/links.

The term "target data," as used herein, may refer to data targeted for encryption. Examples of target data may include photos, documents, spreadsheets, audio files, video files, or any type of encryptable data files. Other examples include data stored in database tables, passwords, emails stored on a computer, or any data object.

The system is designed to provide key management without the necessity for centralized servers or passwords.

The system is a threshold cryptosystem (i.e., an M-of-N) enabling the management of keys requiring multiple devices, such as smartphones and computers. By using threshold cryptography, the system avoids the pitfalls of key management that uses centralized servers and passwords.

The system is a true zero trust system. Unlike many traditional zero trust systems that rely on passwords and client certificates, the system enables full separation of keys from identity and access management systems.

The system starts with the generation of multi-part threshold public keys (MPKs). Personal mobile devices can be key holders of shares (A/K/A "shards") of threshold keys, because users will notice quickly if a mobile device is lost and will execute procedures to invalidate the lost device and onboard a substitute device. MPKs allow multiple devices to generate a public/private key pair without any single device obtaining the private key. These are generated using a Pederson's key generation with the appropriate commitments and verifications.

FIG. 1 is a block diagram that illustrates a system 100 for implementing location key encryption. The system 100 comprises profile creation 110, location key creation 120, file encryption 130 and a secure folder backend 140. At the profile creation 110, the system 100 generates a profile key (BLS Key), which will be discussed in further detail below in conjunction with FIG. 2, and which is used to identify the user and the set of devices he or she owns in a secure and verifiable manner. The generated profile key is not used for encryption, although it could be. Instead it is used to sign declarations that declare the members of the set of the devices and meta data that include human-readable user data (e.g., name, work profile, names of the devices from the set of devices, etc.). These declarations are public declarations and can be published anywhere (e.g., can be stored in the secure folder backend 140).

Other declarations in the secure storage folder 140 can include the name of the secure folder, content of the folder, hierarchy location of the folder, an MPK verification having a proof work to show that MPK was arrived at fairly.

The Profile Key is the cryptographic underpinning of a Profile. This allows a user to sign a message "as an identity" and verify that identity (via Security Words).

Declarations are the list of things that a profile signs and "declares" to be correct. These include:
The list of public keys for devices that comprise the user's identity;
The list of trusted administrators that the user commits to accepting configuration changes from;
The name of the user's identity;
The name and public key of any security groups the user created; and
The name and public key of any secure folders the user created.

Each declaration is written out as a deterministic JSON blob and signed using multipart schnorr signature which is attached to the result. These declarations are then published, to help others coordinate in verification and sharing.

The location key creation 120 creates a location key using the same set of devices. The location keys (public/private pair) are generated from 2 MPKs and the public location key is used by the file encryption 130 to encrypt an Advanced Encryption Standard (AES) key used to encrypt a file, which is then stored (e.g., in the secure folder backend 140). That is, the location key is not necessarily tied to a single user or file but instead to a single location. The location key creation also creates a corresponding private location key, that is sharded (split) among the devices identified by the profile key and used for decryption. The location key creation 120 also creates credential segments that are stored in the secure folder backend 140 with other cryptographic data including the sharded encrypted private location key. Accordingly, when a second user wish access to the files in the location, the first user can get those shards from the file and enable redistribution for the second user's profile.

In other words, when establishing a Location Key, the system simultaneously establishes one pairing curve (BLS) key used for signing and one traditional elliptic curve key (SECPK) used for encryption. The purpose in choosing two curves is that decryption must be performant, but our search system uses a pairing curve. Choosing two curves allows for both of these properties.

During the file encryption 130, the file encryption 130 generates an AES key and uses that key with AES Galois/Counter Mode (GCM) to encrypt an unencrypted file. The AES key is then encrypted with the location key for the location that the encrypted file is stored in (e.g., secure folder backend 140). The file encryption 130 uses Elliptic Curve Integrated Encryption Scheme (ECIES) or a threshold version of ECIES. In addition, the file encryption 130 generates a credential segment that contains an ePub needed for the decrypting the file. Both the credential and the encrypted file can then be stored together in a same file in the secure folder backend 140.

Figure 8:
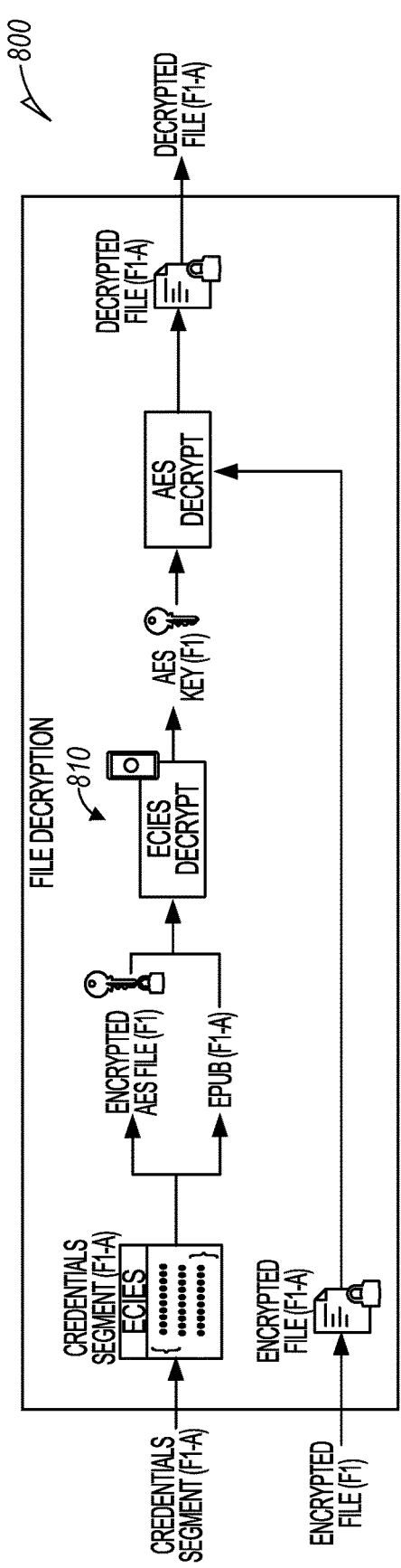
FIG. 8 is a block diagram that illustrates a file decryption system.

During decryption, as will be discussed further below in conjunction with FIG. 8 and FIG. 9, the location private key is never reassembled to decrypt an encrypted file. Instead, decryption is done via partial decryption. A first device receives the EPub and computes a partial decryption result using the EPub and that device's shard. Then, further devices compute their partial decryption results in the same manner, and all return their results to the originator of the request. The originator combines the partial decryption results to construct the original encryption key, which is then used to decrypt the file contents.

Accordingly, at no time does location private key come together on a single device. When decrypting a file, it reveals no information about any other file or directory in the location.

Figure 2:
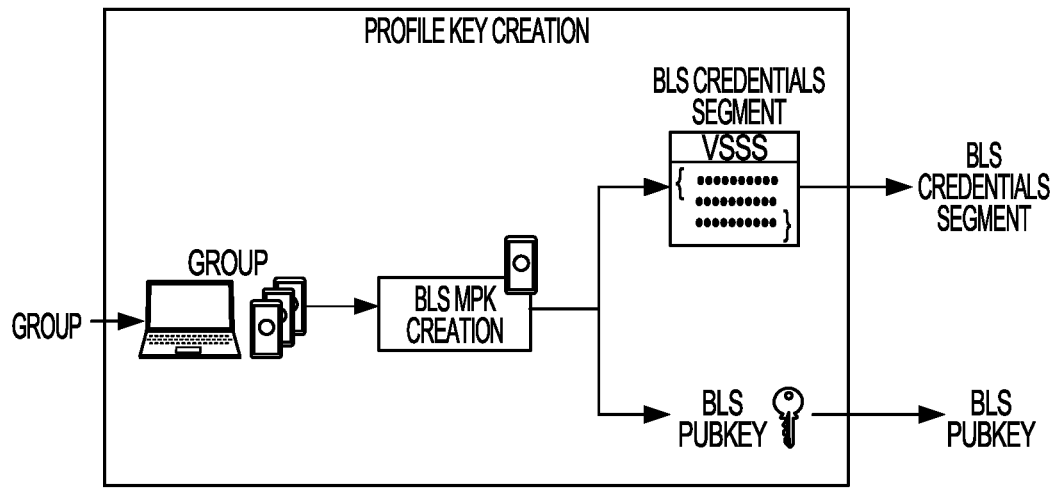
FIG. 2 is a block diagram that illustrates profile key creation for use in the location key encryption system.

FIG. 2 is a block diagram that illustrates profile key creation 111 for use in the location key encryption system 100. A group of devices is identified for a user (e.g., laptop, mobile phone, tablet, etc.), which are then used to create a MPK (which will be discussed further below) on a Boneh-Lynn-Shacham (BLS) curve, which generates a threshold key to sign with (it takes a plurality (m of n) devices to sign with the threshold key).

The system 100 employs a MofNop System, also known as a threshold consensus system. That is, requests must be approved by M of N devices. Cryptographically, there are only three main kinds of MofNop's: signing, decrypting, and redistributing.

In a MofNop, each device performs a partial computation, which are then combined in order to produce the final result. These partial computations are done in way such that the device(s) combining the partial results gains no cryptographic information outside of what was explicitly approved. For signing and decrypting, typically only one device needs to produce the final result either a signature or a decryption.

EXAMPLES

Figure 3:
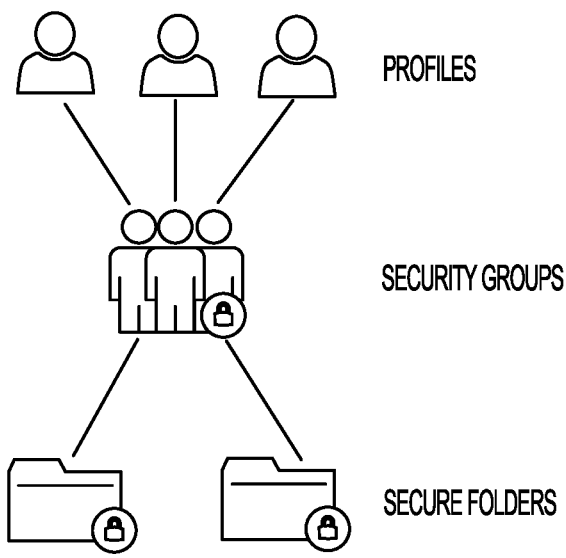
FIG. 3 is a block diagram of an example security groups.

Adding/Removing Devices: Uses redistribution
Opening a file: Uses decryption
roof of identity ownership and declarations: Uses signing FIG. 3 is a block diagram of example security groups. Security Groups are a collection of Profiles that have access to an LK. When the Security Group (SG) is applied to a secure folder, all Profiles with access to the LK will gain access to the secure folder's contents. Note that a LK can be used to access files in more than one secure folder.

In the system 100, files are encrypted for a location key rather than another user's profile directly. The location key can be "redistributed" to other profiles which will give them access to the location key, i.e., profiles can be added to a Security Group. Once added, these profiles can unlock files that are encrypted with that LK by decrypting the AES key used to encrypt a file.

Figure 4:
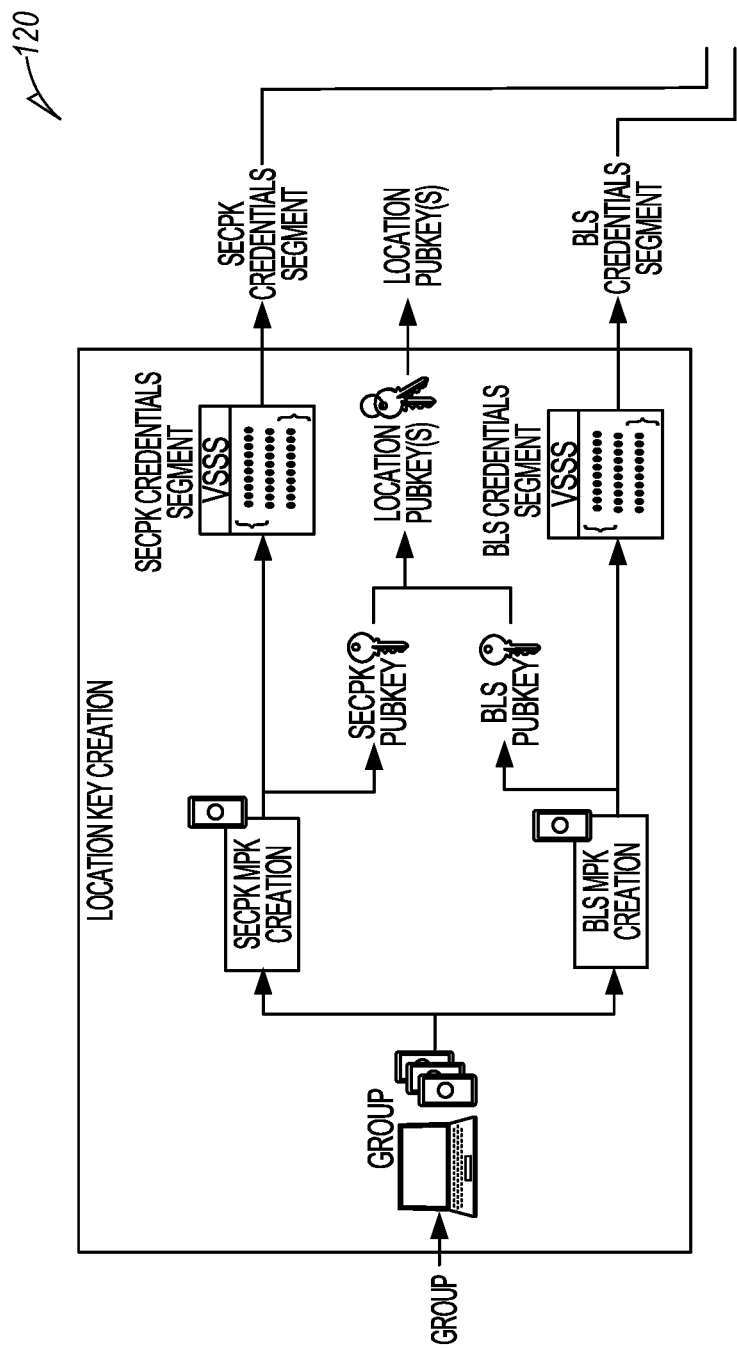
FIG. 4 is a block diagram illustrating an location key creation system for use with the location key encryption system.

FIG. 4 is a block diagram illustrating a location key creation system 120 for use with the encryption system 100. Location Keys (LKs) are a set of 2 MPKs (encryption and signing) that are used to encrypt files in a storage location. Specifically, a BLS pubkey is created with a BLS curve used for signing and a secpk key is created with a secpk curve for encryption, which in combination for the location key.

During the file encryption 130, the file encryption 130 generates an AES key and uses that key with AES Galois/Counter Mode (GCM) to encrypt an unencrypted file. The AES key is then encrypted with the location key for the location that the encrypted file is stored in (e.g., secure folder backend 140). The file encryption 130 uses Elliptic Curve Integrated Encryption Scheme (ECIES) or a threshold version of ECIES, as will be discussed further below. In addition, the file encryption 130 generates a credential segment that contains an ePub needed for the decrypting the file. Both the credential and the encrypted file can then be stored together in a same file in the secure folder backend 140.

Figure 5:
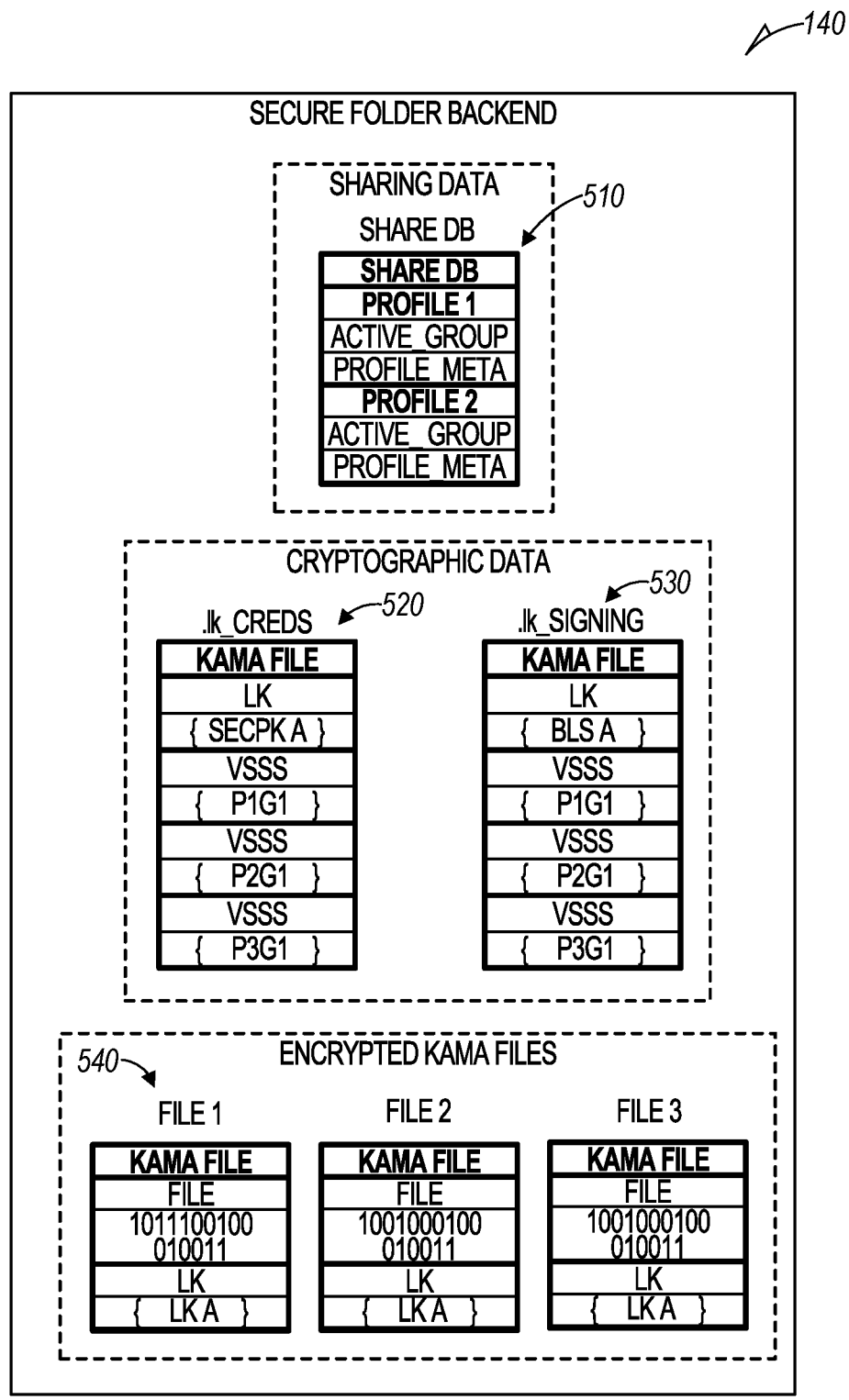
FIG. 5 is a block diagram of an example secure folder backend for use with the location key encryption system.

FIG. 5 is a block diagram of an example secure folder backend 140 for use with the encryption system 100. The secure folder backend includes a Share database (DB) 510, cryptographic data 520, 530 and encrypted files 540, also referred to as KAMA files. Secure folders have names of objects come with proofs of their names.

A "backend storage path" (often referred to as BEDS) is the location where the encrypted files are actually stored on disk. Backend locations can include cloud storage locations.

A "vault" path is the authenticated partial path of a file relative to the mount point on disk where secured files are accessed. Although in-place decryption of files is possible, it is discouraged for security reasons. Instead files are accessed using a virtual file system and are never resident decrypted on disk.

The Share DB is where the system 100 stores system files for use in a Secure Folder. Specifically, declarations are written out to the "share db". This is a public, non-secured location where all users in a share can access (read) the data. If a share db is deleted, corrupted, invalid, or missing, a user's device simply recreates it as needed.

Authenticated metadata is information about an encrypted file, such as its path in the Vault, which issued to identify it. This data can be stored within the encrypted files of FIG. 5 (e.g., file 540). This metadata is intrinsically linked with the cryptographic information of the files such that it can be directly associated with a decryption event; hence, it is "authenticated."

The system 100 individually encrypts files, meaning that if a user decrypts a file, just that file's contents are exposed and not those of any other files. This is referred to as "security for data at rest." The user chooses which data is meant to be "in use" by opening the file and approving the request, and all other data remains protected.

In order for this to be a meaningful choice, the user must be able to identify which file is actually being decrypted. Otherwise, if the user would only be tapping to decrypt a file but not necessarily the file they intended to decrypt, which could easily be exploited in an attack scenario. This identifying information is referred to as metadata.

Metadata is displayed during any sensitive file operation such as a decryption request. For encrypted files, this will describe the path of the file as known to the user, but it can also contain additional information, like the type of object in question.

When a workstation starts a creds (decryption) request for a file, it could simply send the file path to the phone alongside the request. This would appear to satisfy our needs, but offers no actual protection. Consider two attack scenarios:

First, suppose the workstation itself is completely compromised (as we must when considering multi-factor security). When the user goes to open recipes.docx, the compromised workstation switches the decryption credentials to nukes.xlsx under the hood, but sends the string "recipes.docx" to the phone. The user will think that they are decrypting the correct file based on the display, but will in fact be decrypting the attacker-chosen file.

Second, even if the workstation is not compromised, access to the underlying data storage (e.g. network share) may be. The attacker could simply swap recipes.docx.kama and nukes.xlsx.kama. To the workstation and the phone, it will appear we are decrypting the correct file when, again, the other is decrypted.

Accordingly, for metadata to be useful, it must be cryptographically authenticated so that swaps like these are impossible.

Security Guarantees
  Given:
    Gpriv, Gpub—the keypair of the MPK (location key) for this storage location (as discussed below)
    Epriv, Epub—the ephemeral keypair for a given file in the location (used with ECIES as described here)
    meta—some descriptive metadata for the file The system 100 should ensure:
A valid signature for the meta can only be created or modified with:
1. Access to Epriv—since this is ephemeral, this only applies around the time of object creation*
2. The consent of a threshold number of device-owners of Gpriv—this is a mofnop The meta signature can be verified given meta, Gpub, and Epub The signature is inextricably linked with Epub and Gpub, since those values are used in decryption (and other important operations, like search)

Note that while Epriv is never reconstituted after creation, the system 100 can support "single-device renames" (not requiring a mofnop) given access to the decryption key, since you can simply create a new ephemeral keypair in that case.

Practically speaking, this means that valid authenticated metadata can be created three ways:
[1.a.] By creating a new file with a new encryption key, in which case you have no one to fool but yourself.
[1.a.] By having access to the encryption key (e.g. after a decryption mofnop) and creating a new keypair—this is a cached-key rename. If you already have the key, you have no reason to "fake" the metadata.
[1.b.] By having access to a threshold number of devices and doing a rename mofnop. If you have the ability to do a mofnop, you may as well just decrypt the file.

For metadata in the filesystem, the system 100 starts at the root of a given bed ("storage location," "security container") which is directly associated with the Location Key (LK) that encrypts the files therein. The LK is treated like a "special object" at the top of the hierarchy. Below it are files and directories, which are both "normal objects," meaning that they have ephemeral key pairs. Note: this describes the system 100 as used with files, but can also easily apply to any other hierarchical data store (or even a flat one).

Each normal object has metadata with one or more of these fields:
name: the base file name or directory name
parent_epub: the parent identified by its Epub
tag: additional data like "file" or "dir"
lkid: for the directory object living at the root of the bed, this says "this in the LK I represent"

The location key has its own metadata defined by the lk_meta declaration, which gives it a name. Practically, this will be the path to the bed in the virtual file system.

Example

Create a new bed at /Work/Dropbox which maps to ~/.atakama/dropbox [lkid=lk0]
The lk_meta decl is made with name "/Work/Dropbox"
A directory object is made at the root (~/.atakama/dropbox/.atakama_dir.kama) [epub=ep0]
1. Meta={lkid=lk0}
Create a directory: /Work/Dropbox/sub
A directory object is made at ~/.atakama/dropbox/sub/.atakama_dir.kama [epub=ep1]
Meta={parent_epub=ep0, name="sub" }
Create a file: /Work/Dropbox/sub/file.doc
The encrypted file is made at ~/.atakama/dropbox/sub/file.doc.kama [epub=ep2]1. Meta={parent_epub=ep1, name="file.doc" }
mofnop the file
Create display string: "/Work/Dropbox"+"sub"+"file.doc"="Work/Dropbox/sub/file.doc"

An LK is really comprised of 2 MPKs in separate EC curves (in current implementation):
secp256k1—used for ECIES encryption
blsl2_381—used for group signatures and search When initially creating the object, the system 100 has ephemeral keypairs for both curves and signs the metadata with each of them. This allows the system 100 to validate metadata in the context of a cryptographic operation on either curve. For example, in a creds request we care about the secp256k1 signature, but in search (if a search request displayed file metadata) we would want to validate the blsl2_381 signature.

When a file is mofnop-renamed, the ephemeral key signatures are discarded in favor of the one created by the blsl2_381 group key. In this case, the signature data must include the ephemeral public keys on both curves in order to establish explicit linkage with the cryptographic material.

When a Secure Folder (SF) is initially created, a special set of credentials is stored at the root of that SF. Child credentials in the SF will point to those root credentials—and so on, with sub-folders—to create a hierarchy. The root credentials are signed by a profile in a sf_meta declaration when it creates or joins the SF. This allows each profile to have its own name for the SF, while the root creds are shared.

The sharing DB 510 includes for each profile, signed declarations signed by the profile key. For example, if two profiles (corresponding to two users and their sets of devices) have access, then two sets of declarations will be stored in the DB 510. Signing requires a plurality of declared devices (e.g., M of N devices). Declarations in the DB 510 identify the declared devices and meta data for the user (e.g., real life name). Note these declarations can be located anywhere as they are public but for ease of description are shown in the shared 510. Another declaration (now shown) can be a MPK verification—a proof of work showing that the MPK was derived fairly. Other declarations may also be stored in the DB 510.

The cryptographic data, stored in a secure folder of the secure folder backend 140, includes .lk_creds 520 and .lk_signing 530, which are credential segments signed with the location key(s). Note that as the location key is a threshold key, a plurality (e.g., M of N devices) are needed to sign a credential segment. The segments include credentials signed by the secpk key and credentials signed by the BLS key of the location key. The credentials include encrypted shares (shards) of private keys of the secpk key and the BLS key, which allows for redistribution of the private keys to new user profiles, as described in U.S. patent application Ser. No. 17/060,734 filed Oct. 1, 2020 and incorporated herein by reference.

.lk_creds 520, in an example, contains 3 separate profiles P1G1, P2G1, and P3G1. That is profiles 1, 2 and 3 and group 1 of devices for each. A profile may also include a second group of devices that overlaps or is completely separately from a first group, e.g., P1G2. In this example, as there are 3 profiles, 3 users have access to this location key generated by the location key creation 120. Accordingly, instead of needing encryption credentials for each file, encryption credentials can be valid for all files within a location.

The encrypted files 540 includes an encrypted file generated by the file encryption plus a credentials segment that includes the AES symmetric key used to encrypt the file and an epub needed by the ECIES process for decryption.

Figure 6:
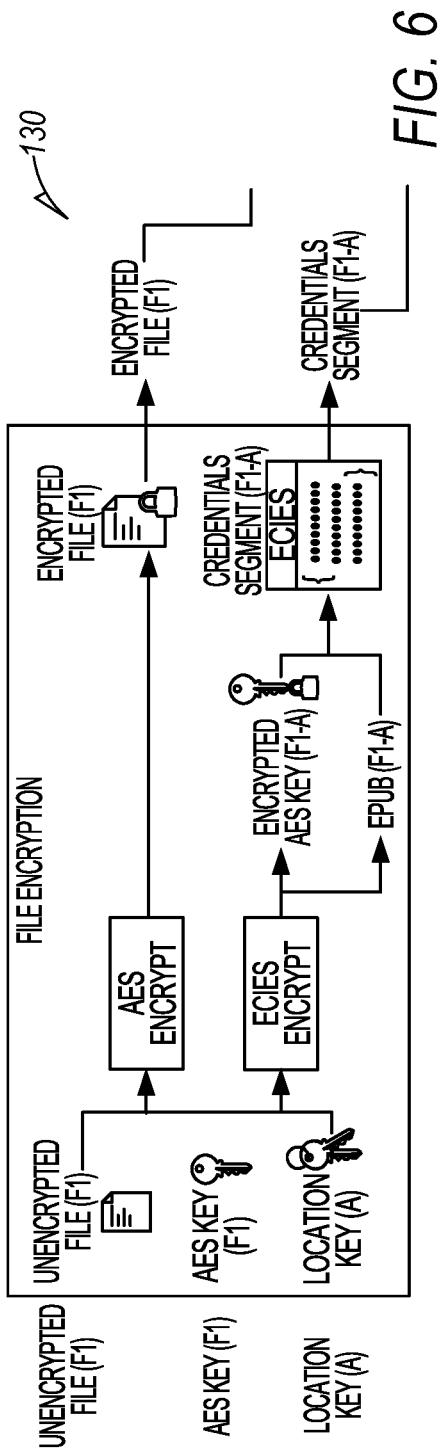
FIG. 6 is a block diagram that illustrates a file encryption system of the location key encryption system.

FIG. 6 is a block diagram that illustrates a file encryption system 130 of the encryption system 100. The system 130, generates an AES key and uses the public AES key to encrypt a file, which is then stored in the secure folder backend 140. In addition, the location key corresponding to where the encrypted file is stored is used to ECIES encrypt the AES private key. The encrypted AES private key and an epub needed to later decrypt the file is stored with the encrypted file (e.g., can be appended to the encrypted file).

Figure 7:
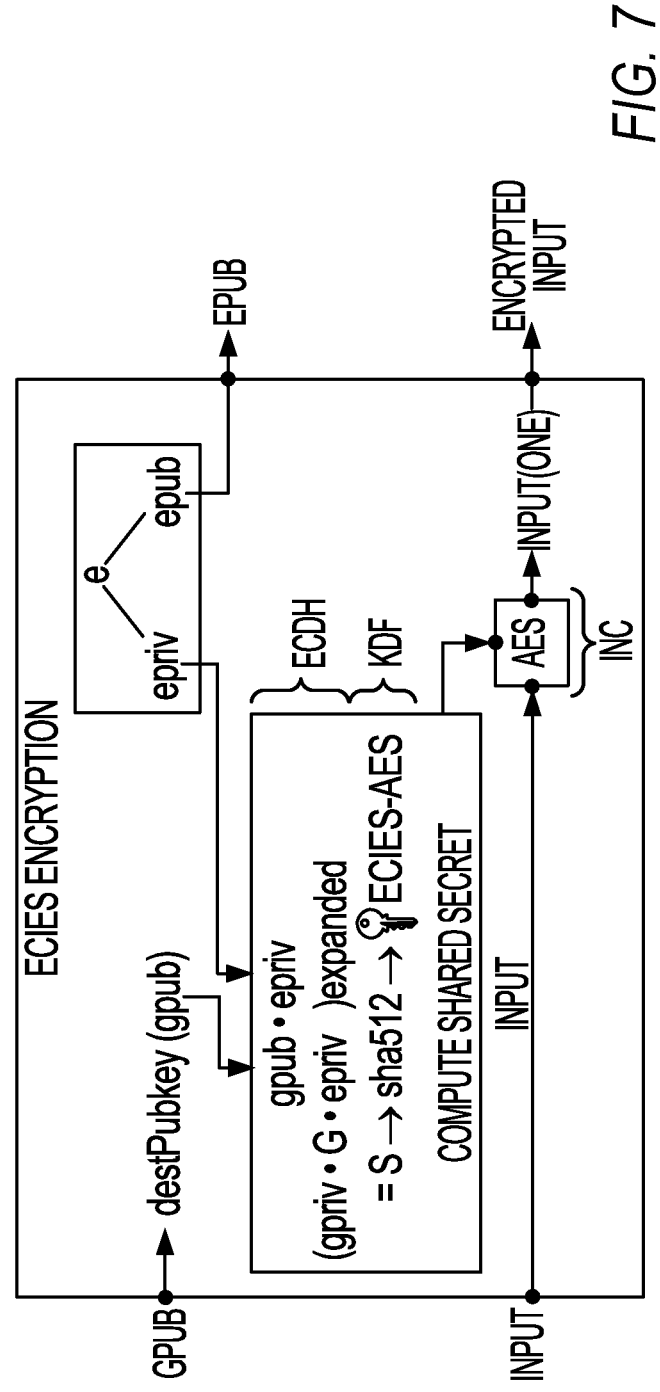
FIG. 7 is a block diagram illustrating an Elliptic Curve Integrated Encryption Scheme (ECIES) encryption system of the file encryption system.

FIG. 7 is a block diagram illustrating a threshold Elliptic Curve Integrated Encryption Scheme (ECIES) encryption system of the file encryption system 130. At all times, any time an Ephemeral Public key is shared, it is shared along with a proof-of-secret key. This is verified before any operations are performed. At all times any time a Device or Group Public Key is shared, it is shared along with a proof-of-work, and a proof-of-secret key. These are always verified before used.

Device encrypts data for a group:
Ephemeral key e is generated randomly;
Group pubkey gpub is multiplied by Ephemeral privkey (Product can be represented as gPriv*Generator point of the curve G*epriv);
The resulting value is the "Shared Secret" between the Group and the Ephemeral Key;
An AES Key is derived from a Sha512 of Shared Secret;
Input data is AES encrypted using the derived key; and
The encrypted data and the ephemeral pubkey are returned to caller FIG. 8 is a block diagram that illustrates a file decryption system 800. The system 800 retrieves the file 540 including the credential segment and encrypted data. The system 800 then decrypts encrypted AES key using the epub using ECIES decrypt 810, as discussed in further detail in conjunction with FIG. 9. With the AES key, the system 800 then decrypts the file.

Figure 9:
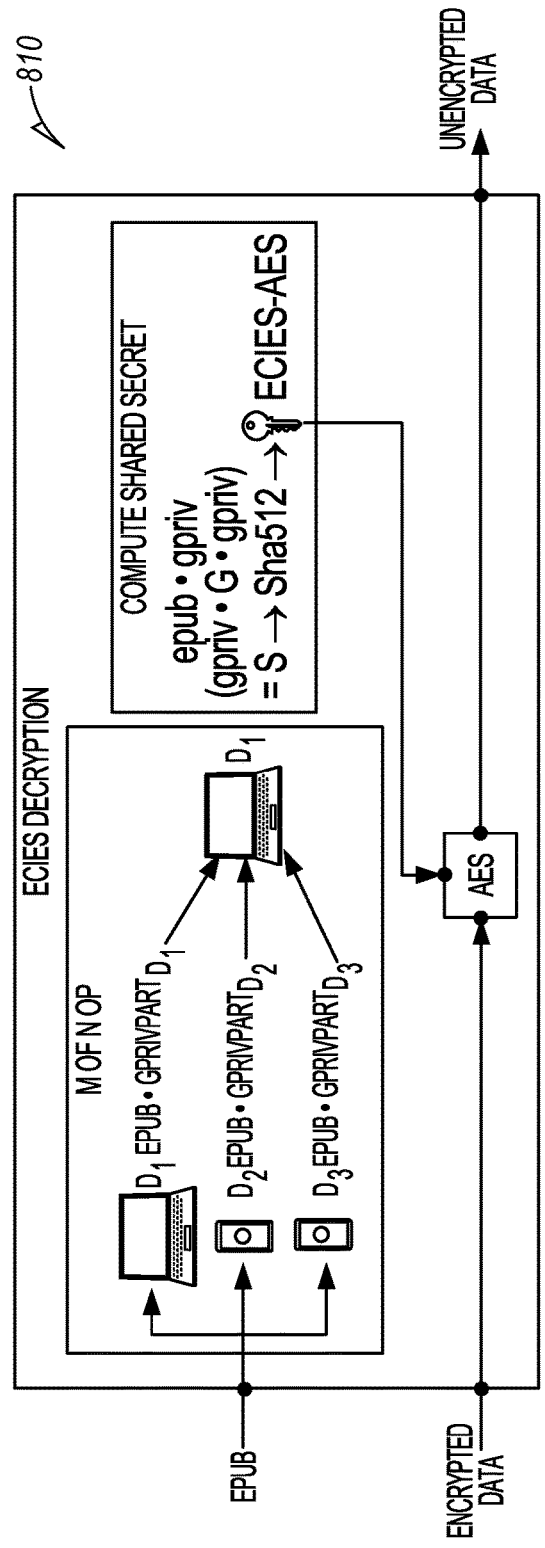
FIG. 9 is a block diagram that illustrates an ECIES decryption system for use with the file decryption system.
Figure 10A:
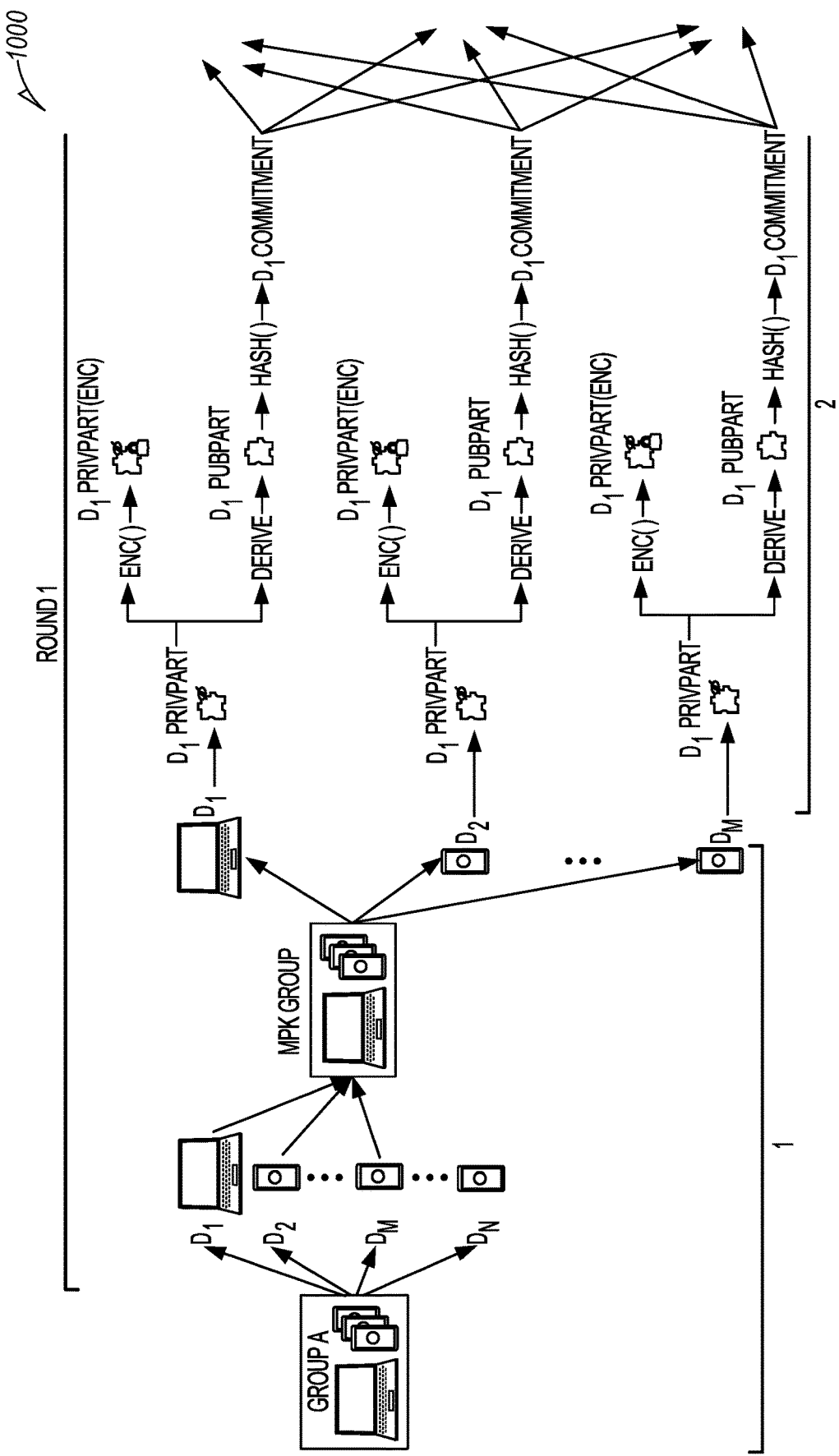
FIGS. 10A, B and C are block diagrams that illustrates a multi-party key generation system.
Figure 10B:
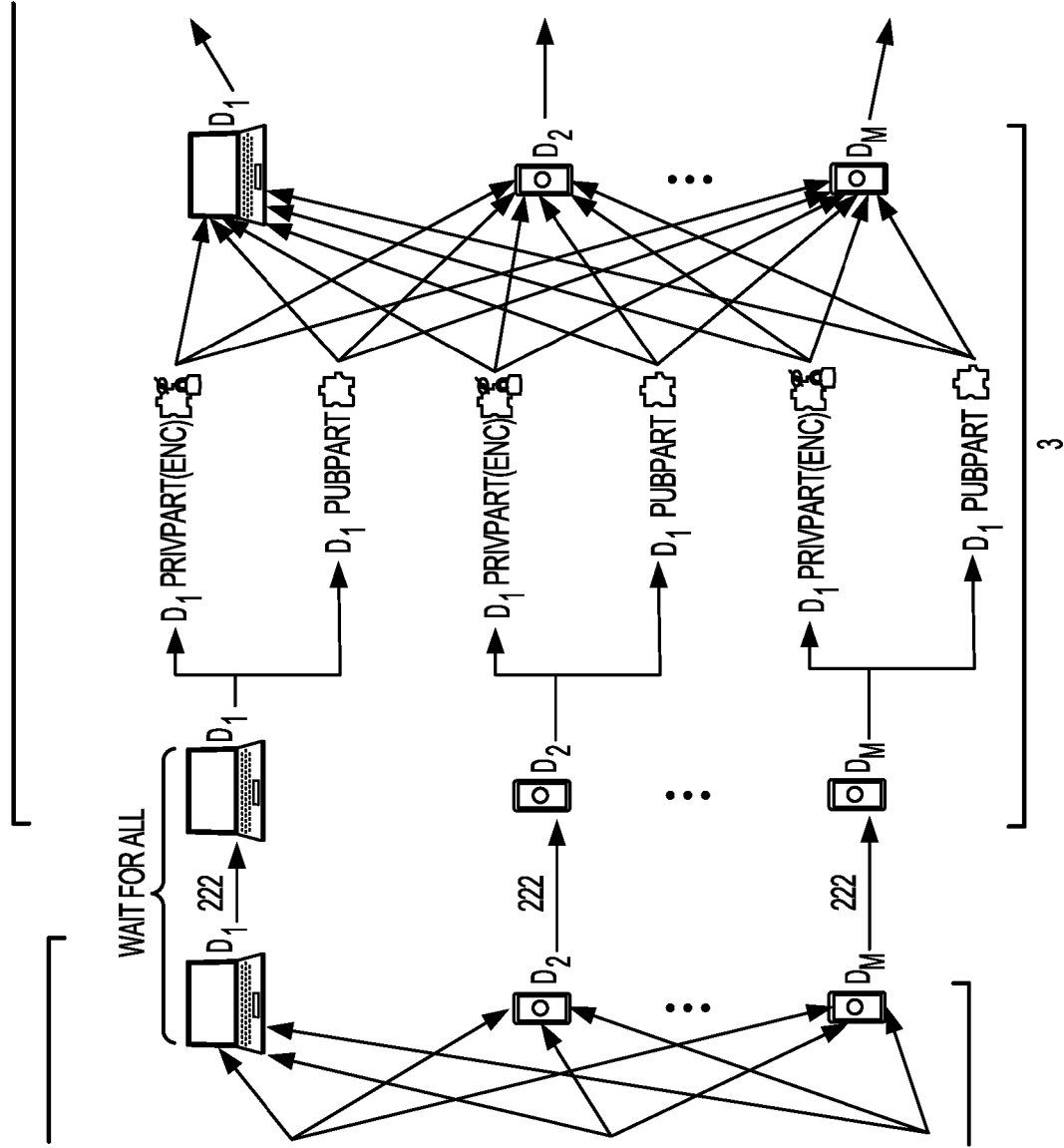
Figure 10C:
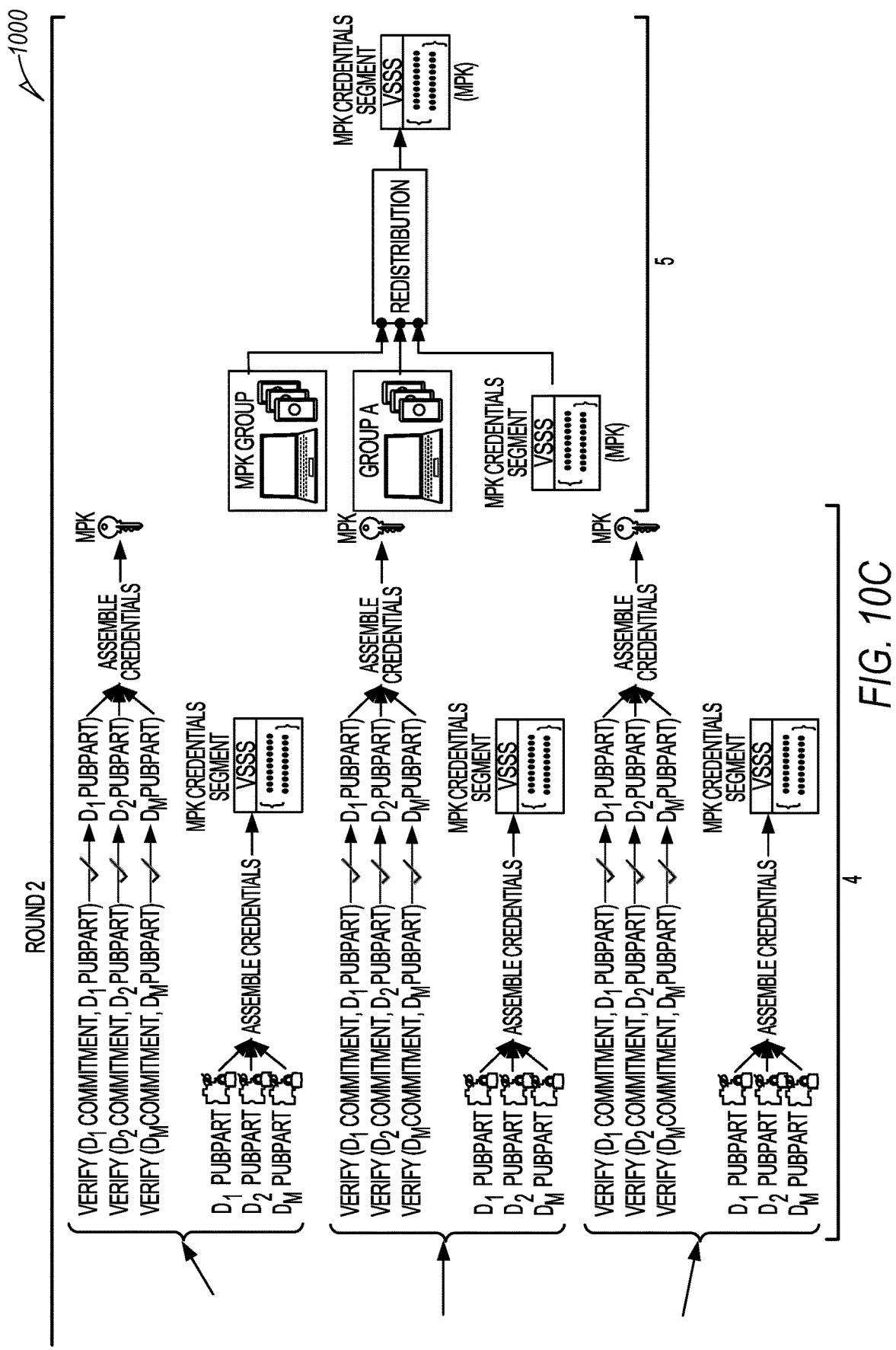

FIG. 9 is a block diagram that illustrates a threshold ECIES decryption system 810 for use with the file decryption system 800. The system 810 uses a threshold key so the private key for decryption does not exist on any single device. Instead, partial decryptions are done using parts of the private key as described below. The group (M of N devices) defined by the relevant profile is used to decrypt data for a device:

MofNop is created with the Ephemeral pubkey (epub) in the init.
Each approving device takes the epub and multiplies it against their gPrivPart to compute their shared secret part (The location key is composed of 2 MPKs. The "gPrivPart" is a shard of one of the MPKs).
Each approving device then sends back a mofnop response including the shared secret part they calculated
The originating device can then take M shared secret parts and combine them to compute the Shared Secret
The AES Key is derived from a Sha512 of Shared Secret
Encrypted input data is AES decrypted using the derived AES key
Unencrypted data is returned to the caller FIGS. 10A, B, and C are block diagrams that illustrates a multi-party key generation system 1000. Multi-party keys (mpk) is a system for multiple devices to generate a public/private key pair without any single device obtaining the private key. This will be used for creating any words after onboarding, for creating a profile key, and for Location Keys.

The process is as follows:
Each device rolls a random number. This is their private key part.
Each device derives a public key part from their private key part.
Each device hashes their public key part and sends this commitment to every other device.
Once a device has all the commitments it expects, it sends out its public key part.
The workstation uses the M public key parts, after verifying that they match their commitments, to calculate the public part of an mpk.
If necessary, the private key (which has never been constructed) is redisted to all N devices in the group.
Conceptually, instead of the workstation generating a shared secret and dealing it out to devices, each device generates its own share, creating an "implied" secret.
So each device generates a random number, privi.
From this they derive a public key, pubi=privi*G, where G is a generator in ECC. From the public parts, the ws can use the trapdoor function to generate the public key. This public key is the same as the one that would be derived from using Shamir's Secret Sharing (SSS) with privy.
Reconstructing the public key is mathematically the same as search. For this reason, the function kata.vsss_reconstruct_hasho is used to construct the public key.
This feature requires a lot of communication with large latency amongst devices. For this reason, the initial mofnop doesn't do any real work. It just gathers a list of devices who are about to create the key (and implicitly checks that the user currently has enough devices to make an mpk). All the real work happens in other messages (mpk_pubpart) outside the mofnop.
For Location Keys (LKs), each location has a public/private key pair that encrypts all the AES keys in that location and a separate public/private key pair that is primarily used for metadata operations. Every group that has access to the location is given shards that can reconstruct to the private key. (Note that the system 100 never reconstructs the private key).

Formation of the MPK Group—[Round 1—Stage 1]
An MPK group is chosen from a group of devices. The number of devices in the MPK group equals the security threshold of the original device group. This MPK group will be used to construct the multi-party key in a coordinated fashion.

Private Part Generation & Commitment Transmission—[Round 1—Stage 2]
(Each Device):
Device rolls a random number which serves as its private part of the MPK.
Device encrypts the private for itself and stores it in its database
Device derives its public part of the MPK which corresponds to its private part. This is also stored in the database.
Device hashes the value of its public part to create a commitment. This commitment will serve as proof that the public key was not chosen in a malicious manner during a later phase. (Chosen pubkey attack)
Device sends all other devices in the MPK group a copy of its commitment.

Transmission of Public and Encrypted Private Parts—[Round 2—Stage 1]
(Each Device):
Device waits to receive all other devices' commitments before moving on. This ensures that each device has already chosen a public key and has committed to it.
Device sends its private part of the MPK to each other device after encrypting it using its own public key. This is for backup purposes. At the end of the process, each device should have backup credentials for all other devices in the MPK group.

Device sends a commitment to the private part (as g^[part]). This is used for verification during redistribution.

Device sends its public part of the MPK to each other device. This public part is signed by the corresponding private key. (Proof of possession/proof of secret key)

Verification of Public Parts, Public Key Assembly, Credential Segment Assembly—[Round 2—Stage 2]

(Each Device):

After receiving all other devices' encrypted private parts and private part commitments, device will assemble them together as a set of credentials which we call the MPK credential segment. (Note: this is a vsss shardset as described in U.S. patent application Ser. No. 16/106,564 filed Aug. 21, 2018, which is incorporated herein by reference).

After receiving all other devices' public parts, device will verify that the commitment matches the public part. This is done by hashing the public part and checking equivalence with the commitment which was sent prior.

After verifying all of the public parts, device will assemble the full MPK public key by combining all of the public parts.

Dealing in the Other Devices—[Round 2—Stage 3]

Note this stage only applies in the case that the MPK group has fewer devices than the original device group.

The workstation will initiate a redistribution from the MPK group original device group. This redistribution is done so that all of the devices in the original group will obtain a share in the MPK. This is done by redistributing the existing MPK credentials (M=N) into the full group (M<N).

Declarations & MPK Signatures

An MPK Signature

Declarations is a term for some data signed by a profile key in a threshold manner. A declaration essentially states that the required threshold of devices for a profile have agreed to sign a piece of data together. An MPK signature.

Declarations During Profile Key Creation

Profile key declarations can be constructed during the creation of the profile as no outside information is required. The declaration parts will be transmitted between devices during the public/private part transmission phase of MPK creation.

Profile Metadata

Any set of metadata that corresponds to the profile itself and contains the profile name.

Active Group

The current group config which represents the set of devices forming the profile and contains an Active group dictionary and Security threshold.

Enterprise Configuration

This declaration is written if the workstation is onboarded with an enterprise configuration present.

Signifies the original enterprise config for this profile. This allows devices to determine whether they should accept an updated config or not and contains the enterprise configuration.

Declarations During Location Key Creation

Location key declarations are constructed after the Location Key MPK is created. This is due to the fact that the location key MPK identifier itself is used in the signature. The declaration parts will be transmitted after the creation of the location key in the finalization stage.

MPK Verification SECPK

Signifies that the profile trusts the SECPK MPK part of the location key and contains: the hash id of the secpk mpk public key; the mpk type; and the verification depth.

MPK Verification BLS

Same as SECPK

Location Key Metadata

Any set of metadata that corresponds to the location key itself such as the location key name; the hash id of the secpk mpk public key and the hash id of the bls mpk public key.

Figure 11:
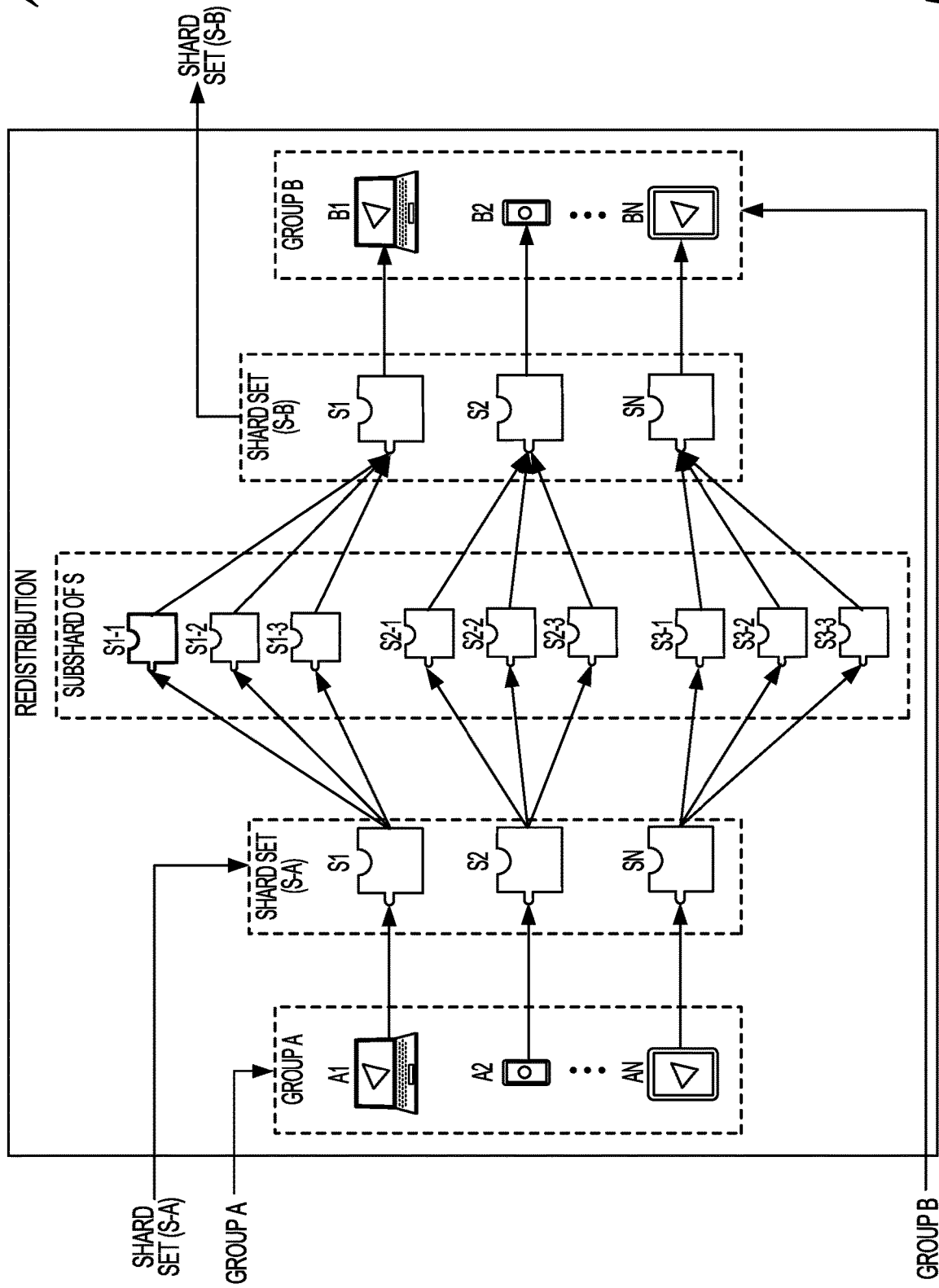
FIG. 11 is a block diagram that illustrates a redistribution system.

FIG. 11 is a block diagram that illustrates a redistribution system 1100. The system 100 uses an implementation of the Verifiable Secret Sharing (VSS) algorithm to "redistribute" the shares or "shards" of a secret without needing to expose the secret in the process. This process is primarily used when adding or removing devices from a Profile, however, it is also used to provide access to other Profiles. FIG. 11 shows Shares of a location key being redistributed to all members of the Security Group. Redistribution is explained in more detail in U.S. patent application Ser. No. 17/060,734 filed Oct. 1, 2020, which is incorporated herein by reference.

Figure 12:
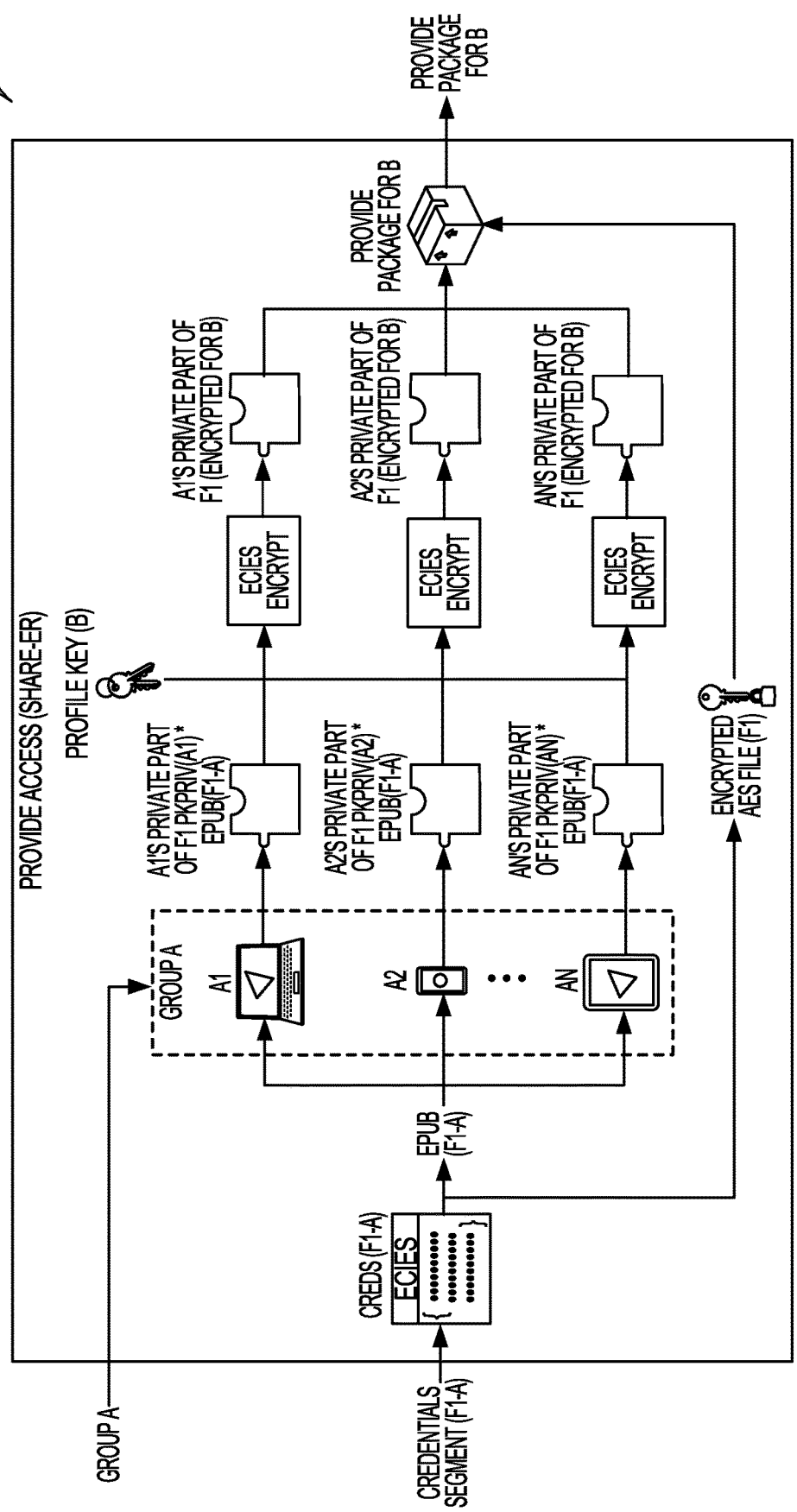
FIG. 12 is a block diagram that illustrates an access provision system.
Figure 13:
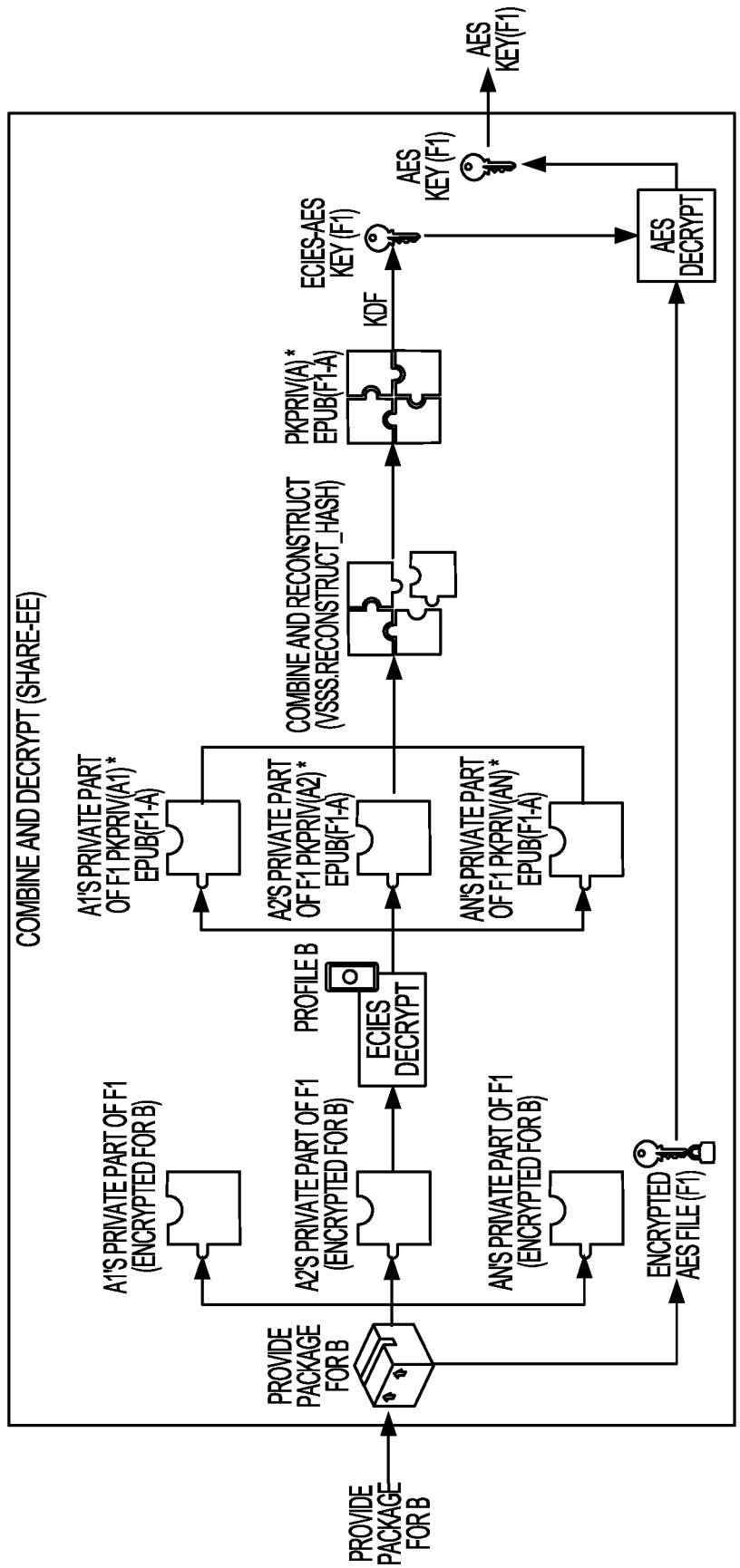
FIG. 13 is a block diagram that illustrates a combine and decrypt system.
Figure 14:
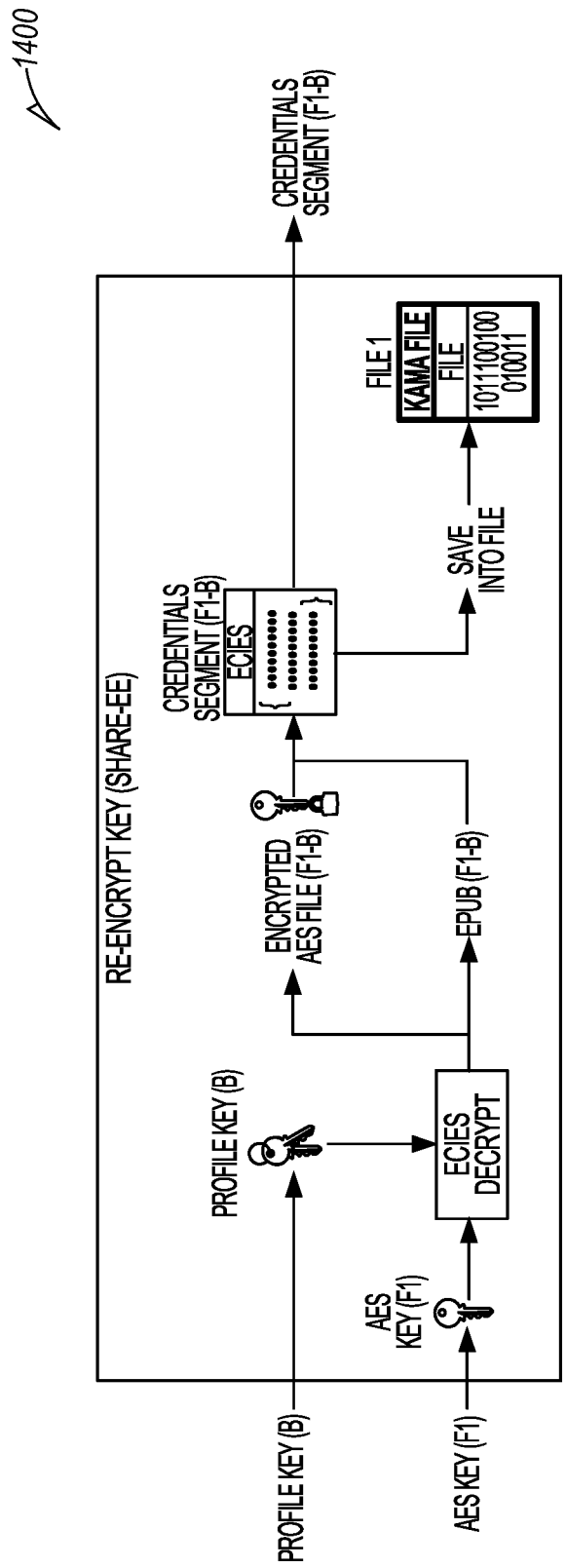
FIG. 14 is a block diagram that illustrates a re-encrypt system.

FIGS. 12-14 show direct sharing. Specifically, FIG. 12 illustrates a block diagram that illustrates an access provision system 1200; FIG. 13 is a block diagram that illustrates a combine and decrypt system 1300; and FIG. 14 is a block diagram that illustrates a re-encrypt system 1400. In addition to Security Group based sharing of FIG. 11, the system 100 also supports explicit (Profile to Profile) sharing which does not make use of any intermediate location key or security group.

Figure 15:
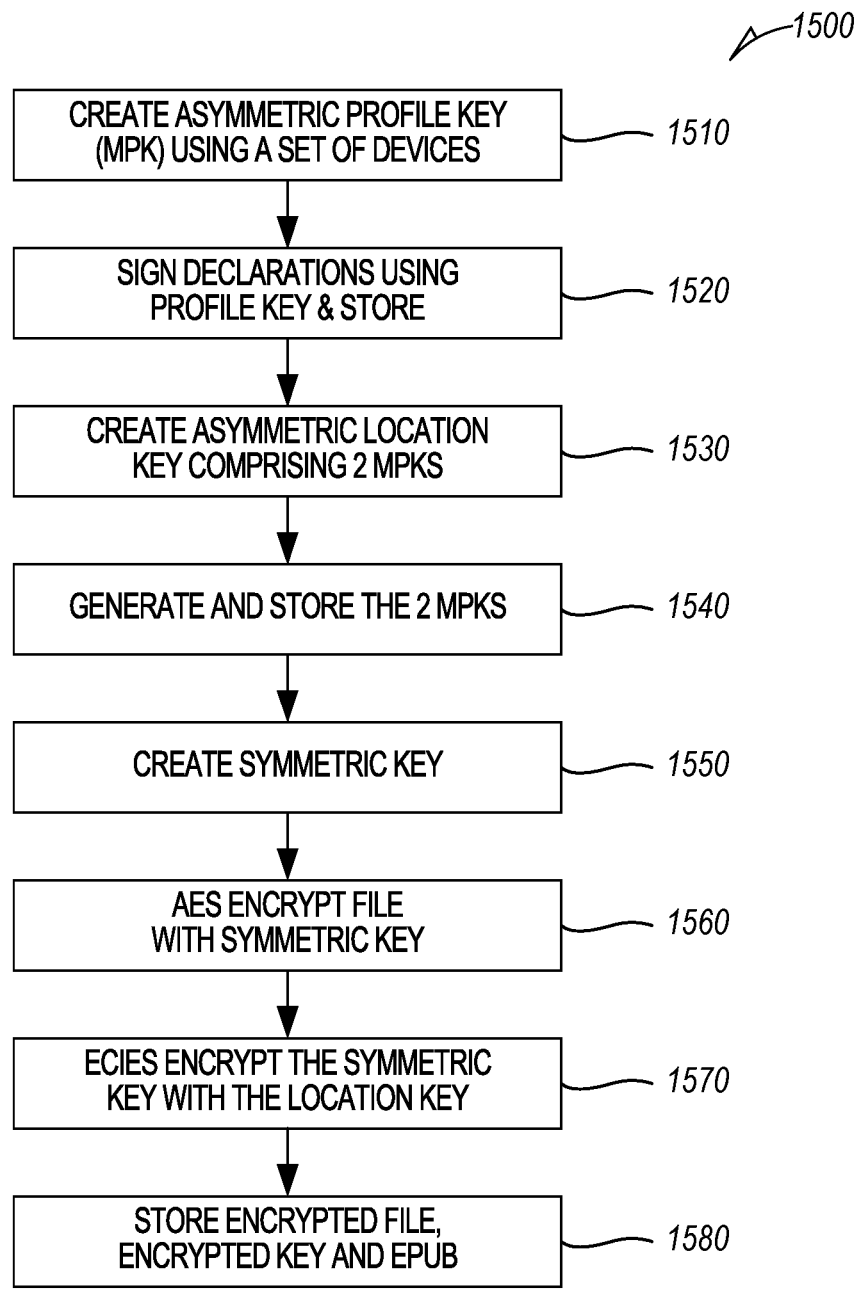
FIG. 15 is a flowchart that illustrates a method of encryption.

FIG. 15 is a flowchart illustrating a method 1500 of encryption. First, a set of devices is identified (e.g., selected by a user) and an asymmetric profile key is created (or generated) using that set of devices in block 1510 and described above. Next, the profile key is used to sign the declarations for metadata and identifying the set of devices, which are then stored in a public location at block 1520. At block 1530 a location key (for a location where encrypted files will be stored) is created comprising two MPKs using elliptic curves—a secpk key and a BLS key. These are generated and stored as credential segments at block 1540. Next, a symmetric key is created using AES-GCM at block 1550. The symmetric key is then used to encrypt a file at block 1560 and stored at a location corresponding to the location key at block 1580. In addition, at block 1570, the symmetric key is ECIES encrypted with the location key and the encrypted symmetric key and epub are stored with the encrypted file at block 1580.

Figure 16:
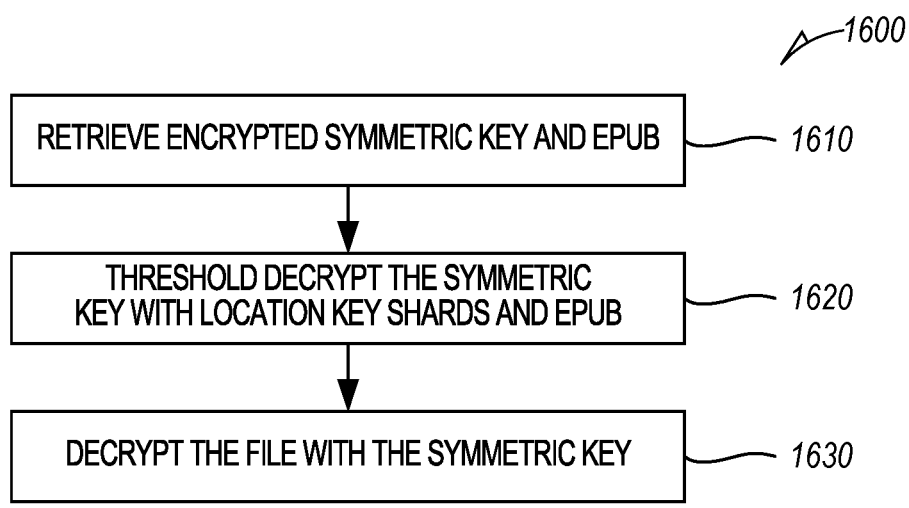
FIG. 16 is a flowchart that illustrates a method decryption.

FIG. 16 is a flowchart illustrating a method 1600 of decryption. At block 1610, the encrypted symmetric key and epub is retrieved (e.g., from the file storing the encrypted data we wish to decrypt). Next, at block 1620, the symmetric key is threshold decrypted (M of N operation) using threshold ECIES, with the location key and epub. The file is then decrypted with the decrypted symmetric key at block 1630.

Figure 17:
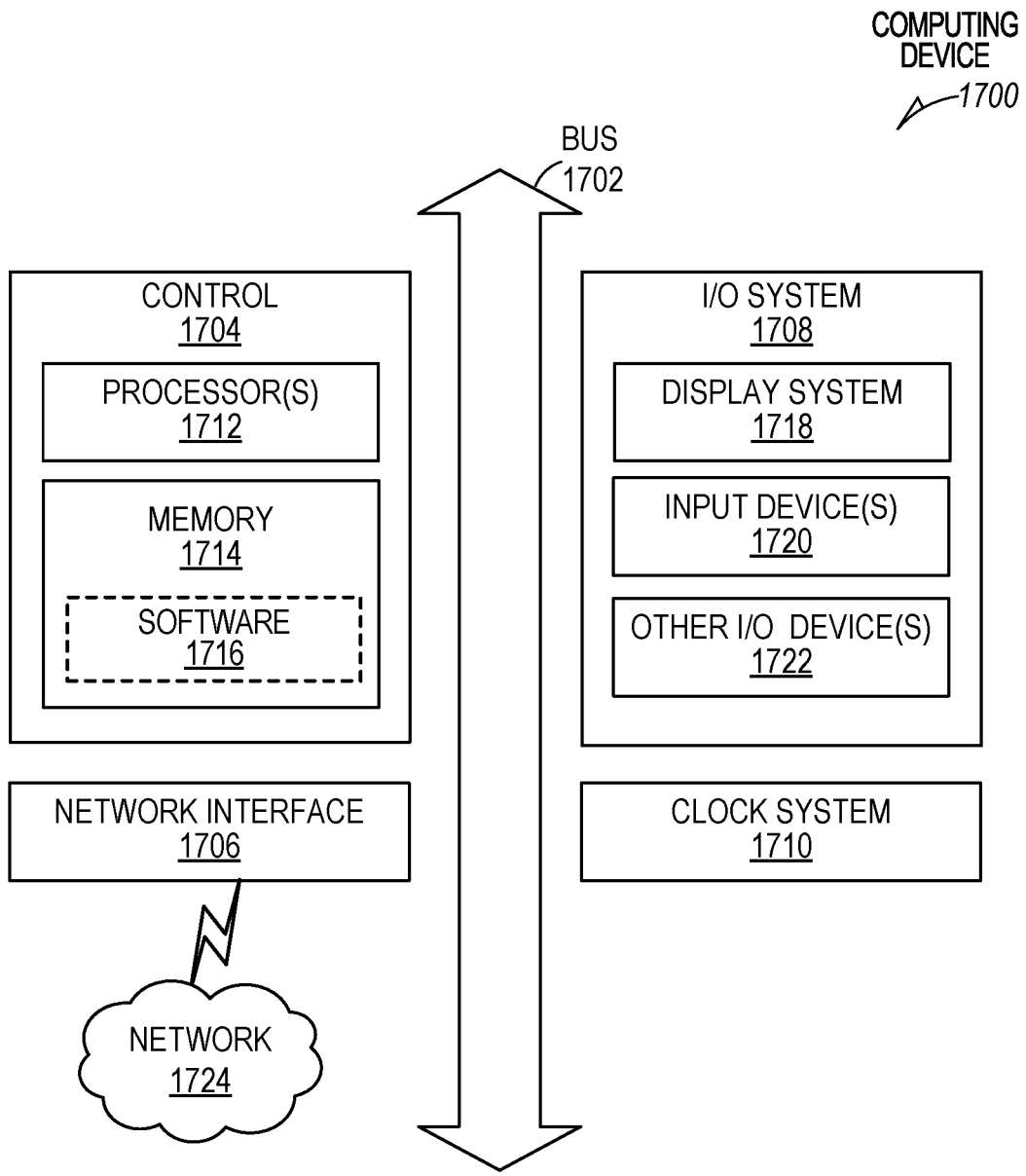
FIG. 17 is a block diagram of a computing device operable to implement aspects of the disclosed embodiments.

FIG. 17 is a block diagram of a computing device 1700 operable to implement aspects of the disclosed embodiments. The computing device 1700 may be a generic computer or specifically designed to carry out features of the system 100. The computing device 1700 may be an originating device, a relay server, or a delegate device embodied as, for example, a system-on-chip (SOC), a single-board computer (SBC) system, a server, a desktop or laptop computer, a kiosk, a mainframe, a mesh of computer systems, a handheld mobile device, or combinations thereof.

The computing device 1700 may be a standalone device or part of a distributed system that spans multiple networks, locations, machines, or combinations thereof. In some embodiments, the computing device 1700 operates as a server computer (e.g., relay server) or a client device (e.g., originating device, delegate device) in a client-server network environment, or as a peer machine in a peer-to-peer system. In some embodiments, the computing device 1700 may perform one or more steps of the disclosed embodiments in real-time, in near real-time, offline, by batch processing, or combinations thereof.

As shown, the computing device 1700 includes a bus 1702 operable to transfer data between hardware components. These components include a control 1704 (i.e., processing system), a network interface 1706, an Input/Output (I/O) system 1708, and a clock system 1710. The computing device 1700 may include other components not shown or further discussed for the sake of brevity. One having ordinary skill in the art will understand any hardware and software included but not shown in FIG. 17.

The control 1704 includes one or more processors 1712 (e.g., central processing units (CPUs), application specific integrated circuits (ASICs), and/or field programmable gate arrays (FPGAs)) and memory 1714 (which may include software 1716). The memory 1714 may include, for example, volatile memory such as random-access memory (RAM) and/or non-volatile memory such as read-only memory (ROM). The memory 1714 can be local, remote, or distributed.

A software program (e.g., software 1716), when referred to as "implemented in a computer-readable storage medium," includes computer-readable instructions stored in a memory (e.g., memory 1014). A processor (e.g., processor 1012) is "configured to execute a software program" when at least one value associated with the software program is stored in a register that is readable by the processor. In some embodiments, routines executed to implement the disclosed embodiments may be implemented as part of operating system (OS) software (e.g., MICROSOFT WINDOWS, LINUX) or a specific software application, component, program, object, module or sequence of instructions referred to as "computer programs."

As such, the computer programs typically comprise one or more instructions set at various times in various memory devices of a computer (e.g., computing device 1700) and which, when read and executed by at least one processor (e.g., processor 1712), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 1714).

The network interface 1706 may include a modem or other interfaces (not shown) for coupling the computing device 1700 to other computers, for example, over the network 1724. The I/O system 1708 may operate to control various I/O devices, including peripheral devices such as a display system 1718 (e.g., a monitor or touch-sensitive display) and one or more input devices 1720 (e.g., a keyboard and/or pointing device). Other I/O devices 1722 may include, for example, a disk drive, printer, scanner, or the like. Lastly, the clock system 1710 controls a timer for use by the disclosed embodiments.

Operation of a memory device (e.g., memory 1714), such as a change in state from a binary one to a binary zero (or vice versa) may comprise a visually perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Figure 18:
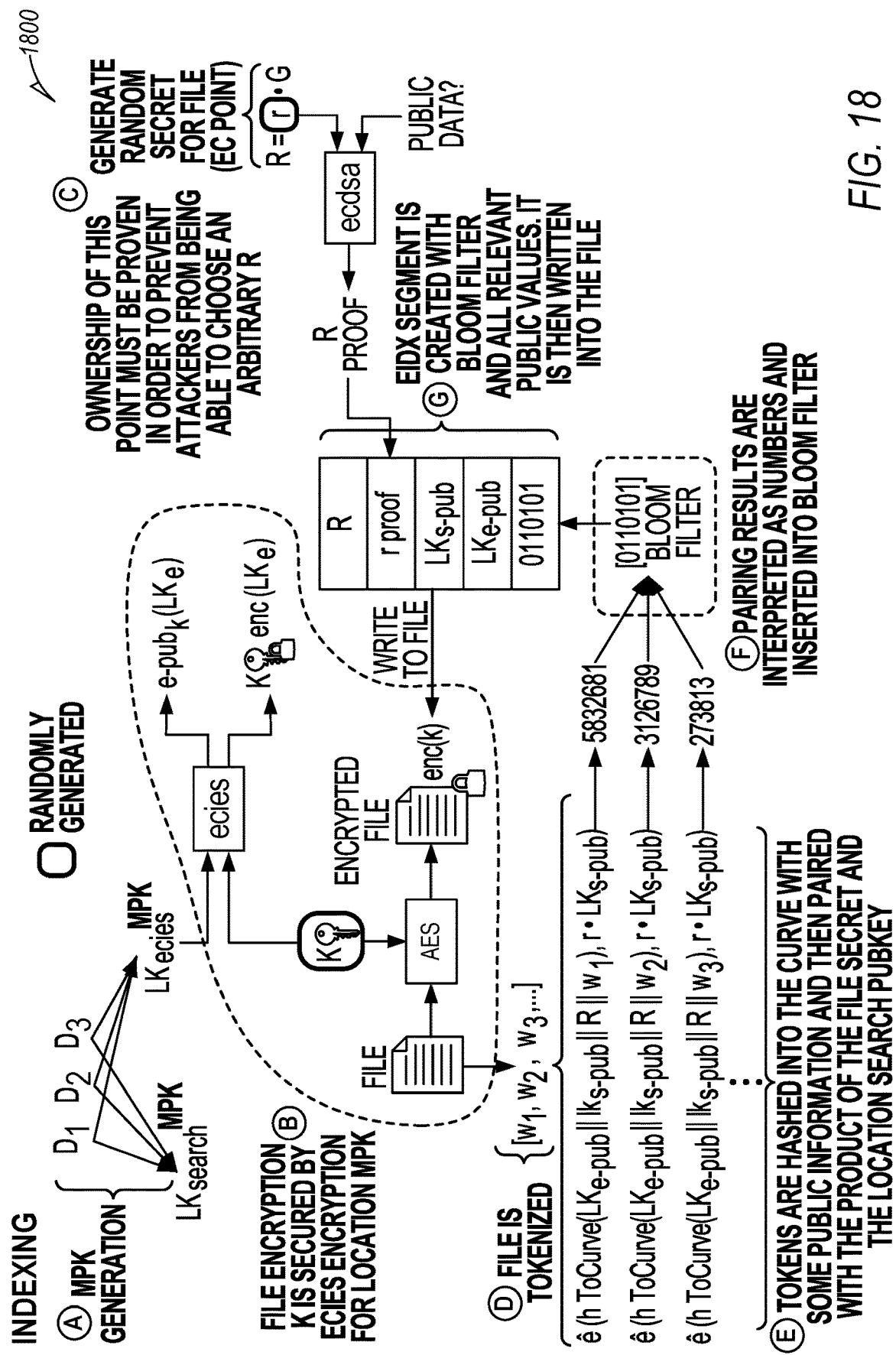
FIG. 18 is a block diagram that illustrates indexing of data for searching.

FIG. 18 is a block diagram that illustrates indexing 1800 of data for searching.

Terminology

MPK: Thresholded Multi-part Key. This is an asymmetric key-pair with public and private parts.

LK: A location key (MPK) which represents a shared location.

$LK_{ecies}$: The location's mpk key-pair which is used for ecies file encryption. (EC Group 1)

$LK_{e\text{-}pub}$: The ecies mpk's public key $LK_{e\text{-}priv}$: The ecies mpk's private key $LK_{search}$: The location's mpk key-pair which is used for searching and file indexing. (EC Group 2)

$LK_{s\text{-}pub}$: The search mpk's public key $LK_{s\text{-}priv}$: The search mpk's private key R: The file secret which will be used for indexing and searching. Each file needs its own R.

hToCurve( ): A function which hashes the data into a specific EC group.

ê( ): Elliptic curve pairing operation.

A. MPK Generation for the Location

At the time of location creation, two MPKS must be generated, one for search ($LK_{search}$) and one for encryption ($LK_{ecies}$). These keys must then be redistributed to an group of devices with a thresholded scheme. The MPKs are created as described above.

B. File Encryption

Similar to the above threshold ECIES for files. The main difference being that the location key represents a location and a collection of users rather than a single user.

C. File Search Secret

For security reasons, each file will need its own private value r. This private value r is randomly generated and can be multiplied against the generator point G of a curve to produce its public value. In order to prove ownership of this private value, we sign the public value with the private value r to generate rproof, which is stored in the indexed file along with R. r is ephemeral and lost after indexing.

D. Tokenization

The file for encryption is tokenized and each word or token (w1, w2, etc.) is then used in the creation of the encrypted index.

E. Convert Token to Index Value

The first step of creating the index value is hashing the token into the curve with alongside other relevant public data. The curve can be a high-speed pairing curve, e.g., tate-curves. It can be BLS (As in BLS MPK creation), e.g., curve of the LKs.

$$\text{curve-hashed token} = \text{hToCurve}(LK_{e\text{-}pub} \| LK_{s\text{-}pub} \| R \| \text{token})$$

Once we have the curve-hashed token, the index value is created by performing an elliptic curve pairing operation between the curve-hashed token and product of the file's secret value and the public location search key:

$$\text{index value} = ê(\text{curve-hashed token}, r * LK_{s\text{-}pub})$$

Re-Indexing an Existing File (e.g., after Modifying a File)

Since r is forgotten after the initial indexing, we use the index value below for reindexing. The value on the right, $LK_{s\text{-}priv}*R$, will be obtained during the credentials request.

$$\text{index value} = \hat{e}(\text{curve-hashed token}, LK_{s\text{-}priv}*R)$$

This means that each approver will need to compute $(LK_{s\text{-}privpar}*R)$ and then send it back to the workstation whenever a file is accessed in a way which could lead to the file being modified.

Upon re-indexing, the workstation would need to reconstruct the original $LK_{s\text{-}priv}*R$ and re-use it so that any sharing participants will not lose search capabilities.

F. Bloom Filter Creation

All of the resulting index values from the pairing operation are then inserted into a bloom filter. This bloom filter will act as our encrypted index and it what allows us to know if a token exists in a file. The bloom filter is then inserted into the index.

G. Encrypted Index (EIDX) Segment Creation

After all of the trapdoor results have been inserted into the index, we will need write the index into the file. This is done by creating the "eidx" segment within the warfile. The "eidx" segment contains the encrypted index and all other data relevant to search.

EIDX Segment Contents:

[
R
$R_{proof}$
$LK_{s\text{-}pub}$
$LK_{e\text{-}pub}$
Bloom filter ( the encrypted Index )
]

Figure 19:
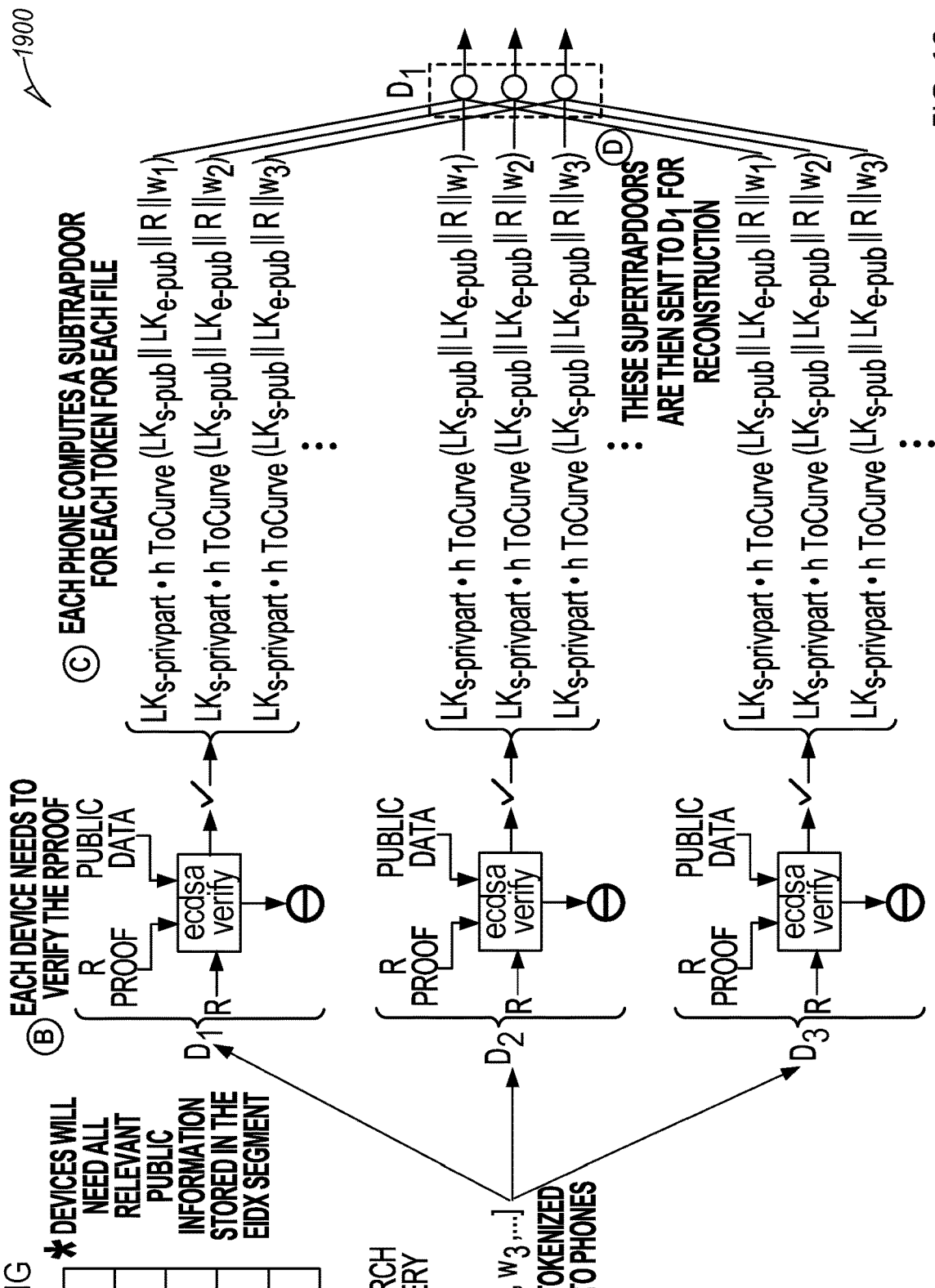
FIGS. 19 and 19B are block diagrams that illustrates encrypted search.
Figure 19B:
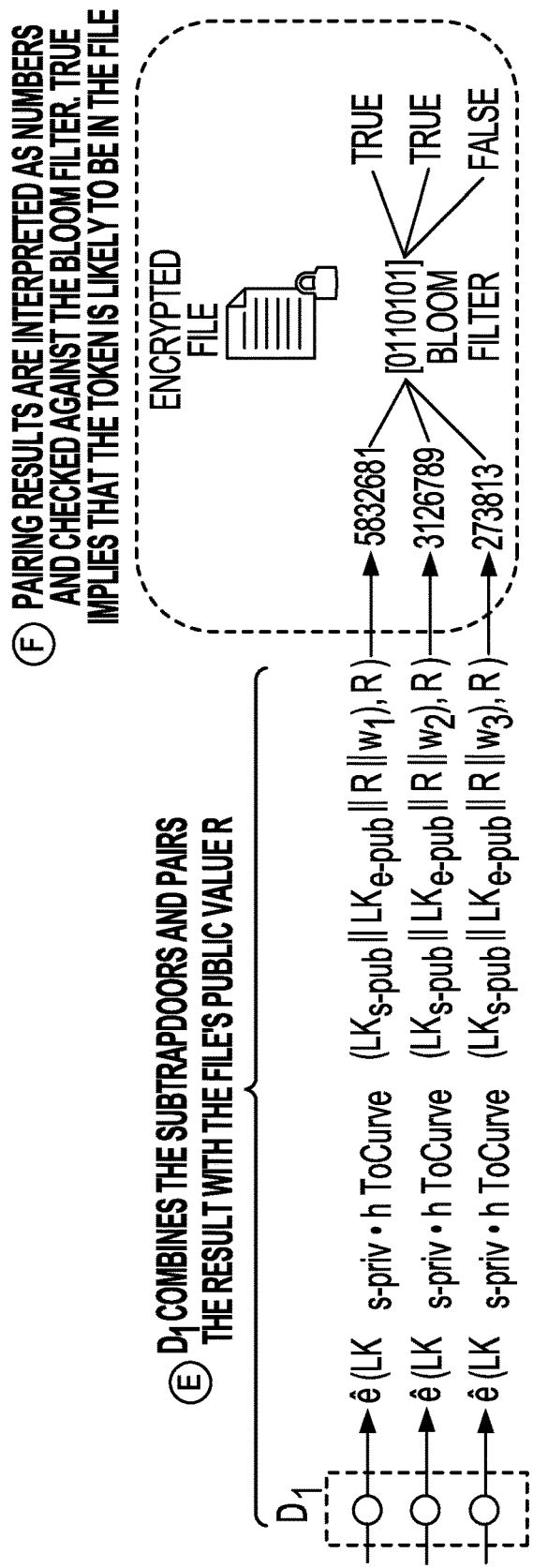

FIGS. 19 and 19B are block diagrams that illustrates encrypted search 1900.

A. Query Tokenization

The search query is tokenized by the workstation using same logic used to tokenize file contents and each token is then sent to each of devices in the group in the form of a search request.

Note B-D are performed on each device which has approved the search request

B. Verify File Secret

After approving the search request, the device needs to verify that the file secret R was not chosen by an attacker. This is done by checking that $r_{proof}$ signature was indeed signed by the owner of r (the indexer).

C. Sub-Trapdoor (Partial Search Result) Computation

O(F*T) where F is the number of files and T is the number of tokens in the query.

For each file, for each token the device needs to compute a "sub-trapdoor" by hashing the token into the curve and then multiplying the result with its private part of $LK_{s\text{-}priv}$. The result of this operation is a "sub-trapdoor" which will be needed by the workstation to perform the search.

E. Sub-Trapdoor Responses

Once all "sub-trapdoors" have been computed, the device will send them to the workstation. Depending on how many of these "sub-trapdoors" are needed, these responses can be sent back to the workstation in batches.

F. "Trapdoor Value" Recombination

The workstation will aggregate all the "sub-trapdoor" responses from the devices. Once the workstation has all of the "sub-trapdoors" for a file token combination, it can recombine them into the "trapdoor value".

Trapdoor Value=$LK_{s\text{-}priv}*\text{hToCurve}(LK_{e\text{-}pub} \| LK_{s\text{-}pub} \| R \| w1)$ G. Convert "Trapdoor Value" to Index Value (Equivalent to E of Indexing)

Before we can check the index, each trapdoor value must be converted into an "index value" which is equivalent to the one used during the original indexing process. The index value is computed by with an elliptic curve pairing operation between the "trapdoor value" and the file public value R. The result of this operation is a point on a third curve which is then interpreted as a number.

H. Check Bloom Filter

Each index value is then checked against the bloom filter. The results of this check are boolean and indicate whether the file likely contains the token or not. These results are aggregated and combined to create the search results.

Figure 20:
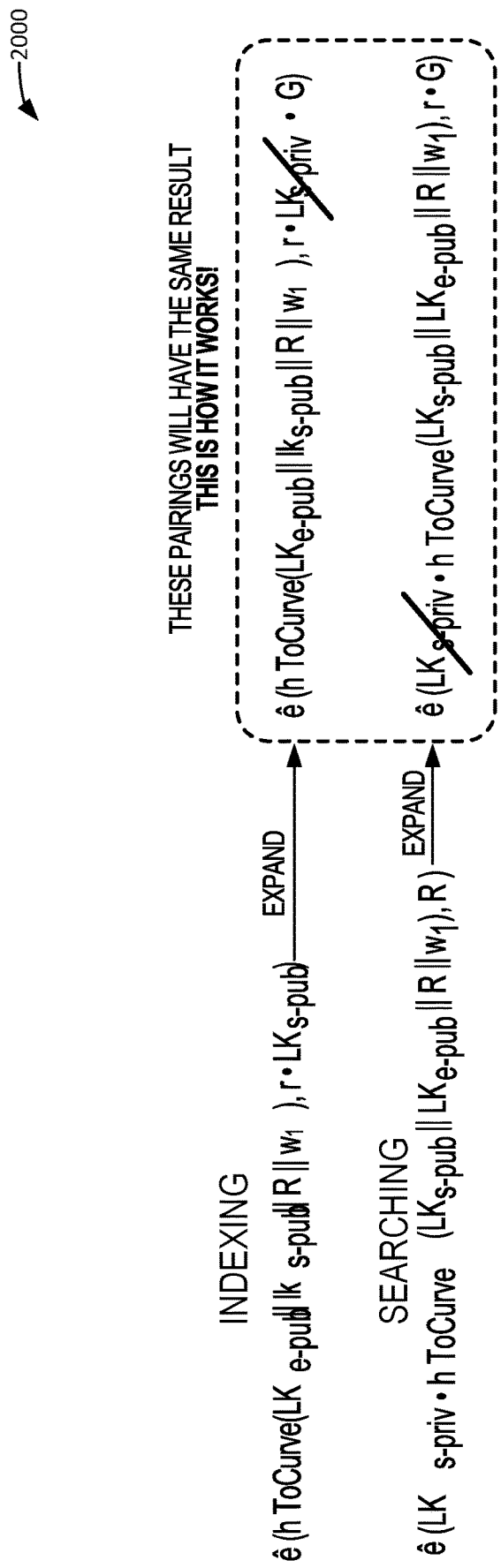
FIG. 20 is a diagram illustrating equations for the indexing and searching steps.

FIG. 20 is a diagram illustrating equations 2000 for the indexing and searching. If you take the pairing results from the indexing step and the searching step, you will find that they equate to the same thing. Due to the neat bilinear properties of elliptic curve pairing, we are able to retrieve the same values under different conditions. After expanding the terms, it is clear that the two expressions equate to the same value as illustrated in FIG. 20.

Figure 21:
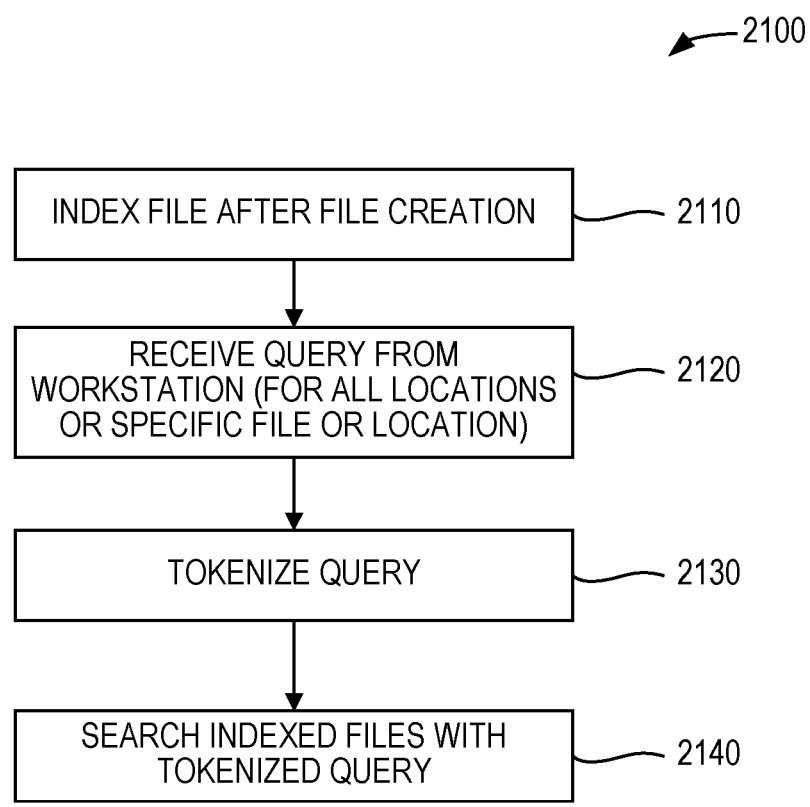
FIG. 21 is a flowchart illustrating a method of encrypted search.

FIG. 21 is a flowchart illustrating a method 2100 of encrypted search. A file to be encrypted is initially indexed (2110) as described above, with an index segment added into the encrypted file. Then, a query is received (2120) to search all locations, specific locations, or file(s). That received query is tokenized (2130) as described above and then the indexed files are searched (2140) with the tokenized query as described above.

The following examples describe various embodiments of methods, machine-readable media, and systems (e.g., machines, devices, or other apparatus) discussed herein.

1. A method for searching an encrypted file, comprising:
receiving a query from a first device of a set of devices;
tokenizing the query;
searching the encrypted file, without decrypting the file, for the tokenized query;
wherein the searching includes checking a bloom filter of an index of the encrypted file, the index including a file public secret (R), a proof of work for the file secret (Rproof), a multipart threshold public encryption key (LKe-pub), a multipart threshold public search key (LKs-pub), and the bloom filter, the bloom filter including index values that are elliptic curve paired between a curve-hashed token of the encrypted file and the product of the encrypted file's ephemeral secret value (r) and the multipart threshold public search key (LKs-pub);
aggregating results of the search; and
outputting the aggregated results.

2. The method of claim 1, wherein generating the index comprises:
generating a multipart threshold search key comprising the public search key (LKs-pub) and a private search key (LKs-priv);
distributing the private search key (LKs-priv) to the set of devices with a threshold scheme;
generating the file public secret (R) by multiplying the file's ephemeral secret value (r) against a generator point of a curve (G);
signing the file public secret (R) with the file's ephemeral secret value (r) to generate the proof of work for the file secret (Rproof);
tokenizing the file;

converting the tokens to the index values; and
creating the bloom filter.

3. The method of claim 2, wherein the searching includes, at M of N of the set of devices, curve-hashing each query token and multiplying the result by a shard of a private search key (LKs-priv) of a multipart threshold search key to generate a sub-trapdoor.

4. The method of claim 3, wherein the searching includes combines the sub-trapdoors at the first device and elliptic curve pairing the sub-trapdoors with the file public secret (R) to generate query index values.

5. The method of claim 4, wherein the searching includes checking the query index values against the file's bloom filter.

6. The method of claim 1, wherein the searching includes, at M of N of the set of devices, verifying the file secret R by confirming the proof of work for the file secret (Rproof) was signed by the owner of the file's ephemeral secret value (r).

7. The method of claim 1, wherein the multipart threshold keys are generated by each device of the set of devices, comprising:
generating a private key part;
deriving a public key from the private key part;
hashing the public key part and transmitting the hash to other devices of the set of devices;
receiving hashes of the other devices public key parts;
upon receiving all expected hashes, transmitting its public key part to the other devices;
receiving public key parts from the other devices;
verifying the received hashes match the received public key parts; and
calculating a public part of the multipart threshold key.

8. The method of claim 1, further comprising approving the search query by M of N devices from the set of devices.

9. The method of claim 1, wherein the elliptic curve pairing uses a Boneh-Lynn-Shacham (BLS) curve.

10. A non-transitory computer-readable medium having stored thereon instructions to cause a computer to execute a method, the method comprising:
receiving a query from a first device of a set of devices;
tokenizing the query;
searching the encrypted file, without decrypting the file, for the tokenized query;
wherein the searching includes checking a bloom filter of an index of the encrypted file, the index including a file public secret (R), a proof of work for the file secret (Rproof), a multipart threshold public encryption key (LKe-pub), a multipart threshold public search key (LKs-pub), and the bloom filter, the bloom filter including index values that are elliptic curve paired between a curve-hashed token of the encrypted file and the product of the encrypted file's ephemeral secret value (r) and the multipart threshold public search key (LKs-pub);
aggregating results of the search; and
outputting the aggregated results.

11. A system, comprising:
a processor; and
non-transitory computer-readable medium having stored thereon instructions to cause the processor to execute a method, the method comprising:
receiving a query from a first device of a set of devices;
tokenizing the query;
searching the encrypted file, without decrypting the file, for the tokenized query;
wherein the searching includes checking a bloom filter of an index of the encrypted file, the index including a file public secret (R), a proof of work for the file secret (Rproof), a multipart threshold public encryption key (LKe-pub), a multipart threshold public search key (LKs-pub), and the bloom filter, the bloom filter including index values that are elliptic curve paired between a curve-hashed token of the encrypted file and the product of the encrypted file's ephemeral secret value (r) and the multipart threshold public search key (LKs-pub);
aggregating results of the search; and
outputting the aggregated results.

12. The system of claim 11, wherein generating the index comprises:
generating a multipart threshold search key comprising the public search key (LKs-pub) and a private search key (LKs-priv);
distributing the private search key (LKs-priv) to the set of devices with a threshold scheme;
generating the file public secret (R) by multiplying the file's ephemeral secret value (r) against a generator point of a curve (G);
signing the file public secret (R) with the file's ephemeral secret value (r) to generate the proof of
work for the file secret (Rproof);
tokenizing the file;
converting the tokens to the index values; and
creating the bloom filter.

13. The system of claim 12, wherein the searching includes, at M of N of the set of devices, curve-hashing each query token and multiplying the result by a shard of a private search key (LKs-priv) of a multipart threshold search key to generate a sub-trapdoor.

14. The system of claim 13, wherein the searching includes combines the sub-trapdoors at the first device and elliptic curve pairing the sub-trapdoors with the file public secret (R) to generate query index values.

15. The system of claim 14, wherein the searching includes checking the query index values against the file's bloom filter.

16. The system of claim 11, wherein the searching includes, at M of N of the set of devices, verifying the file secret R by confirming the proof of work for the file secret (Rproof) was signed by the owner of the file's ephemeral secret value (r).

17. The system of claim 11, wherein the multipart threshold keys are generated by each device of the set of devices, comprising:
generating a private key part;
deriving a public key from the private key part;
hashing the public key part and transmitting the hash to other devices of the set of devices;
receiving hashes of the other devices public key parts;
upon receiving all expected hashes, transmitting its public key part to the other devices;
receiving public key parts from the other devices;
verifying the received hashes match the received public key parts; and
calculating a public part of the multipart threshold key.

18. The system of claim 11, further comprising approving the search query by M of N devices from the set of devices.

19. The system of claim 11, wherein the elliptic curve pairing uses a Boneh-Lynn-Shacham (BLS) curve.

20. The system of claim 11, wherein the elliptic curve pairing uses Tate curves.

While embodiments have been described in the context of fully functioning computers, those skilled in the art will appreciate that the various embodiments are capable of being distributed as a program product in a variety of forms and that the disclosure applies equally regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the claims disclosed herein. Thus, the description is to be regarded as illustrative instead of limiting.

What is claimed is:

1. A method for searching an encrypted file, comprising:
receiving a query from a first device of a set of devices;
tokenizing the query;
searching the encrypted file, without decrypting the file, for the tokenized query;
wherein the searching includes checking a bloom filter of an index of the encrypted file, the index including a file public secret (R), a proof of work for the file secret (Rproof), a multipart threshold public encryption key (LKe-pub), a multipart threshold public search key (LKs-pub), and the bloom filter, the bloom filter including index values that are elliptic curve paired between a curve-hashed token of the encrypted file and the product of the encrypted file's ephemeral secret value (r) and the multipart threshold public search key (LKs-pub);
aggregating results of the search; and
outputting the aggregated results;
wherein the searching includes, at M of N of the set of devices, verifying the file secret R by confirming the proof of work for the file secret (Rproof) was signed by the owner of the file's ephemeral secret value (r).

2. The method of claim 1, wherein generating the index comprises:
generating a multipart threshold search key comprising the public search key (LKs-pub) and a private search key (LKs-priv);
distributing the private search key (LKs-priv) to the set of devices with a threshold scheme;
generating the file public secret (R) by multiplying the file's ephemeral secret value (r) against a generator point of a curve (G);
signing the file public secret (R) with the file's ephemeral secret value (r) to generate the proof of work for the file secret (Rproof);
tokenizing the file;
converting the tokens to the index values; and
creating the bloom filter.

3. The method of claim 2, wherein the searching includes, at M of N of the set of devices, curve-hashing each query token and multiplying the result by a shard of a private search key (LKs-priv) of a multipart threshold search key to generate a sub-trapdoor.

4. The method of claim 3, wherein the searching includes combines the sub-trapdoors at the first device and elliptic curve pairing the sub-trapdoors with the file public secret (R) to generate query index values.

5. The method of claim 4, wherein the searching includes checking the query index values against the file's bloom filter.

6. The method of claim 1, wherein the multipart threshold keys are generated by each device of the set of devices, comprising:

generating a private key part;
deriving a public key from the private key part;
hashing the public key part and transmitting the hash to other devices of the set of devices;
receiving hashes of the other devices public key parts;
upon receiving all expected hashes, transmitting its public key part to the other devices;
receiving public key parts from the other devices;
verifying the received hashes match the received public key parts; and
calculating a public part of the multipart threshold key.

7. The method of claim 1, further comprising approving the search query by M of N devices from the set of devices.

8. The method of claim 1, wherein the elliptic curve pairing uses a Boneh-Lynn-Shacham (BLS) curve.

9. A non-transitory computer-readable storage medium having stored thereon instructions to cause a computer to execute a method, the method comprising:
receiving a query from a first device of a set of devices;
tokenizing the query;
searching the encrypted file, without decrypting the file, for the tokenized query;
wherein the searching includes checking a bloom filter of an index of the encrypted file, the index including a file public secret (R), a proof of work for the file secret (Rproof), a multipart threshold public encryption key (LKe-pub), a multipart threshold public search key (LKs-pub), and the bloom filter, the bloom filter including index values that are elliptic curve paired between a curve-hashed token of the encrypted file and the product of the encrypted file's ephemeral secret value (r) and the multipart threshold public search key (LKs-pub);
aggregating results of the search; and
outputting the aggregated results;
wherein the searching includes, at M of N of the set of devices, verifying the file secret R by confirming the proof of work for the file secret (Rproof) was signed by the owner of the file's ephemeral secret value (r).

10. A system, comprising:
a hardware processor; and
non-transitory computer-readable storage medium having stored thereon instructions to cause the processor to execute a method, the method comprising:
receiving a query from a first device of a set of devices;
tokenizing the query;
searching the encrypted file, without decrypting the file, for the tokenized query;
wherein the searching includes checking a bloom filter of an index of the encrypted file, the index including a file public secret (R), a proof of work for the file secret (Rproof), a multipart threshold public encryption key (LKe-pub), a multipart threshold public search key (LKs-pub), and the bloom filter, the bloom filter including index values that are elliptic curve paired between a curve-hashed token of the encrypted file and the product of the encrypted file's ephemeral secret value (r) and the multipart threshold public search key (LKs-pub);
aggregating results of the search; and
outputting the aggregated results;
wherein the searching includes, at M of N of the set of devices, verifying the file secret R by confirming the proof of work for the file secret (Rproof) was signed by the owner of the file's ephemeral secret value (r).

11. The system of claim 10, wherein generating the index comprises:
- generating a multipart threshold search key comprising the public search key (LKs-pub) and a private search key (LKs-priv);
- distributing the private search key (LKs-priv) to the set of devices with a threshold scheme;
- generating the file public secret (R) by multiplying the file's ephemeral secret value (r) against a generator point of a curve (G);
- signing the file public secret (R) with the file's ephemeral secret value (r) to generate the proof of work for the file secret (Rproof);
- tokenizing the file;
- converting the tokens to the index values; and
- creating the bloom filter.

12. The system of claim 11, wherein the searching includes, at M of N of the set of devices, curve-hashing each query token and multiplying the result by a shard of a private search key (LKs-priv) of a multipart threshold search key to generate a sub-trapdoor.

13. The system of claim 12, wherein the searching includes combines the sub-trapdoors at the first device and elliptic curve pairing the sub-trapdoors with the file public secret (R) to generate query index values.

14. The system of claim 13, wherein the searching includes checking the query index values against the file's bloom filter.

15. The system of claim 10, wherein the multipart threshold keys are generated by each device of the set of devices, comprising:
- generating a private key part;
- deriving a public key from the private key part;
- hashing the public key part and transmitting the hash to other devices of the set of devices;
- receiving hashes of the other devices public key parts;
- upon receiving all expected hashes, transmitting its public key part to the other devices;
- receiving public key parts from the other devices;
- verifying the received hashes match the received public key parts; and
- calculating a public part of the multipart threshold key.

16. The system of claim 10, further comprising approving the search query by M of N devices from the set of devices.

17. The system of claim 10, wherein the elliptic curve pairing uses a Boneh-Lynn-Shacham (BLS) curve.

18. The system of claim 10, wherein the elliptic curve pairing uses Tate curves.

* * * * *